(12) United States Patent
Eitouni et al.

(10) Patent No.: US 10,158,109 B2
(45) Date of Patent: Dec. 18, 2018

(54) MULTI-PHASE ELECTROLYTE LITHIUM BATTERIES

(71) Applicant: Seeo, Inc, Hayward, CA (US)

(72) Inventors: Hany Basam Eitouni, Oakland, CA (US); Russell Clayton Pratt, San Mateo, CA (US)

(73) Assignee: Seeo, Inc., Hayward, CA (US)

( * ) Notice: Subject to any disclaimer, the term of this patent is extended or adjusted under 35 U.S.C. 154(b) by 283 days.

(21) Appl. No.: 15/164,819

(22) Filed: May 25, 2016

(65) Prior Publication Data

US 2016/0344008 A1 Nov. 24, 2016

Related U.S. Application Data

(63) Continuation of application No. 14/811,664, filed on Jul. 28, 2015.
(Continued)

(51) Int. Cl.
*H01M 4/62* (2006.01)
*H01M 2/16* (2006.01)
(Continued)

(52) U.S. Cl.
CPC .......... *H01M 2/1673* (2013.01); *H01B 1/122* (2013.01); *H01M 4/382* (2013.01);
(Continued)

(58) Field of Classification Search
CPC ........ H01M 2/16; H01M 2/1653; H01M 4/62; H01M 4/621; H01M 4/625; H01M 10/0565
See application file for complete search history.

(56) References Cited

U.S. PATENT DOCUMENTS 3,821,297 A 6/1974 Resnick
5,714,277 A * 2/1998 Kawakami .......... H01M 2/1686
429/129
(Continued)

FOREIGN PATENT DOCUMENTS

JP 2009206004 A 9/2009
WO 2007142731 A2 12/2007
(Continued)

OTHER PUBLICATIONS

Machine Translation of JP2009-206004A, Sep. 10, 2009.
(Continued)

*Primary Examiner* — Kenneth J Douyette
(74) *Attorney, Agent, or Firm* — R'Sue Popowich Caron

(57) ABSTRACT

Electrode assemblies for use in electrochemical cells are provided. The negative electrode assembly includes negative electrode active material and an electrolyte chosen specifically for its useful properties in the negative electrode. Such properties include reductive stability and ability to accommodate expansion and contraction of the negative electrode active material. Similarly, the positive electrode assembly includes positive electrode active material and an electrolyte chosen specifically for its useful properties in the positive electrode. These properties include oxidative stability and the ability to prevent dissolution of transition metals used in the positive electrode active material. A third electrolyte can be used as separator between the negative electrode and the positive electrode. A cell is constructed with a cathode that includes a fluorinated electrolyte which does not penetrate into the solid-state polymer electrolyte separator between it and the lithium-based anode. Such an assembly improves charge transport properties without compromising the strength and durability of the separator.

21 Claims, 12 Drawing Sheets

Related U.S. Application Data

(60) Provisional application No. 62/119,107, filed on Feb. 21, 2015.

(51) Int. Cl.
    *H01M 10/0565* (2010.01)
    *H01B 1/12* (2006.01)
    *H01M 10/0525* (2010.01)
    *H01M 4/38* (2006.01)

(52) U.S. Cl.
    CPC ............. *H01M 4/62* (2013.01); *H01M 4/621* (2013.01); *H01M 4/625* (2013.01); *H01M 10/0525* (2013.01); *H01M 10/0565* (2013.01); *H01M 2300/0082* (2013.01); *H01M 2300/0088* (2013.01); *H01M 2300/0094* (2013.01)

(56) References Cited

U.S. PATENT DOCUMENTS

| | | | |
|---|---|---|---|
| 5,736,274 A * | 4/1998 | Umemoto | C07D 213/20 252/62.2 |
| 5,783,333 A * | 7/1998 | Mayer | H01M 4/131 423/332 |
| 6,210,835 B1 * | 4/2001 | Arai | H01M 6/164 429/199 |
| 8,067,114 B2 | 11/2011 | Kim et al. | |
| 9,368,775 B2 | 6/2016 | Visco et al. | |
| 2001/0036577 A1 * | 11/2001 | Nakane | H01M 4/38 429/223 |
| 2002/0048706 A1 * | 4/2002 | Mayes | C01B 13/14 429/231.1 |
| 2002/0110739 A1 | 8/2002 | McEwen et al. | |
| 2002/0127475 A1 | 9/2002 | Marchionni et al. | |
| 2003/0049538 A1 | 3/2003 | Buerger et al. | |
| 2003/0108800 A1 | 6/2003 | Barbarich | |
| 2003/0181572 A1 | 9/2003 | Tan et al. | |
| 2004/0043298 A1 | 3/2004 | Lee | |
| 2004/0170901 A1 | 9/2004 | Blau et al. | |
| 2005/0034993 A1 * | 2/2005 | Gozdz | H01M 4/13 205/57 |
| 2005/0287441 A1 | 12/2005 | Passerini et al. | |
| 2006/0035987 A1 | 2/2006 | Paddison | |
| 2006/0127766 A1 * | 6/2006 | Yamate | H01M 4/134 429/218.1 |
| 2007/0178133 A1 | 8/2007 | Rolland | |
| 2008/0114143 A1 | 5/2008 | Brothers et al. | |
| 2009/0004568 A1 | 1/2009 | Hirose et al. | |
| 2009/0023038 A1 | 1/2009 | DeSimone et al. | |
| 2009/0029249 A1 | 1/2009 | Takami et al. | |
| 2009/0182087 A1 | 7/2009 | Fudemoto et al. | |
| 2011/0111308 A1 | 5/2011 | Halalay et al. | |
| 2011/0281173 A1 | 11/2011 | Singh et al. | |
| 2012/0121989 A1 | 5/2012 | Roberts et al. | |
| 2013/0063092 A1 | 3/2013 | Yang et al. | |
| 2013/0130069 A1 | 5/2013 | Mullin et al. | |
| 2013/0228950 A1 | 9/2013 | DeSimone et al. | |
| 2013/0273419 A1 | 10/2013 | Pistorino et al. | |
| 2014/0221689 A1 | 8/2014 | Klun et al. | |
| 2016/0028114 A1 | 1/2016 | Pratt et al. | |
| 2016/0093895 A1 | 3/2016 | Du et al. | |
| 2016/0211498 A1 | 7/2016 | Kim et al. | |
| 2016/0221926 A1 | 8/2016 | Teran et al. | |
| 2016/0226101 A1 | 8/2016 | Teran et al. | |
| 2016/0226102 A1 | 8/2016 | Teran et al. | |
| 2016/0226103 A1 | 8/2016 | Teran et al. | |
| 2016/0329613 A1 | 11/2016 | Kusachi et al. | |
| 2017/0117583 A1 | 4/2017 | Matsuno et al. | |

FOREIGN PATENT DOCUMENTS

| | | |
|---|---|---|
| WO | 2010083325 A1 | 7/2010 |
| WO | 2011051275 A1 | 5/2011 |
| WO | 2014190278 A1 | 11/2014 |
| WO | 2014204547 A2 | 12/2014 |
| WO | 2015022229 A1 | 2/2015 |

OTHER PUBLICATIONS

International Search Report for PCT/US16/31685, dated Aug. 16, 2016.
International Search Report for PCT/US2016/025950, dated Jun. 27, 2016.
International Search Report for PCT/US2016/030602.
International Search Report for PCT/US2016/032541.
International Search Report for PCT/US2016/033967 dated Aug. 23, 2016.
Smart. "Improved performance of lithium-ion cells with the use of fluorinated carbonate-based electrolytes," Journal of Power Sources 119-121 (2003) 359-367.
Wong et al.: Nonflammable perfluoropolyether-based electrolytes for lithium batteries. PNAS. 111, 9. 3327-3331; Mar. 4, 2014. [retrieved on May 18, 2016}. Retrieved from the Internet. <URL: http://www.pnas.org/contentl111/9/3327.full.pdf>. entire document.

* cited by examiner

US 10,158,109 B2

MULTI-PHASE ELECTROLYTE LITHIUM BATTERIES

CROSS-REFERENCE TO RELATED APPLICATIONS

This application is a Continuation of U.S. patent application Ser. No. 14/811,664, filed Jul. 28, 2015, now U.S. Pat. No. 9,893,337, which claims priority to U.S. Provisional Patent Application 62/119,107, filed Feb. 21, 2015. This application is also related to International Patent Application PCT/US 16/33967, filed May 25, 2016. All of these patent application are included by reference herein.

BACKGROUND OF THE INVENTION

Field of the Invention

This invention relates generally to lithium batteries, and, more specifically, to the use of a variety of electrolytes in the same lithium battery to optimize its performance.

In order to be useful in a cell, an electrolyte is chemically compatible/stable with both the anode material and the cathode material. In addition, the electrolyte is electrochemically stable, that is, stable against reduction at the anode and oxidation at the cathode when the cell is at potential. These requirements are especially difficult to meet in lithium batteries because of the extreme reactivity of the lithium itself. When a liquid electrolyte is used, it permeates both the anode and the cathode, as well as the separator, so the one electrolyte must meet all criteria. Thus some compromises must be made in choice of electrolyte, as the electrolyte that is best for the anode and the electrolyte that is best for the cathode may not be the same.

Thus there is a clear need for a battery cell design in which different portions of the cell can contain different electrolytes, each optimized for its particular function, but all functioning together without compromising the overall operation of the cell.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
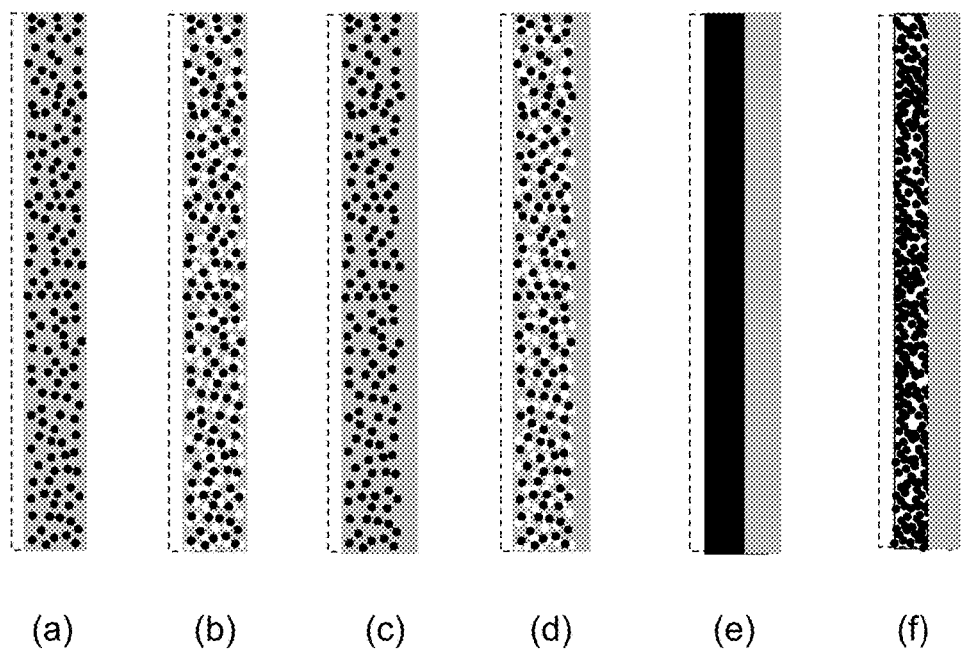
FIG. 1 is a schematic illustration of various negative electrode assemblies, according to embodiments of the invention.

In one embodiment of the invention, the negative electrode is a metal foil comprising the alkali metal. The alkali metal may be any of lithium, sodium, and magnesium. In one arrangement, the negative electrode includes any of Li, Li—Al, Li—Si, Li—Sn, and Li—Mg.

In arrangements where the negative electrode contains lithium, such as in a lithium or lithium-containing foil, the first salt and the second salt are each selected independently from the group consisting of LiTFSI, $LiPF_6$, $LiBF_4$, $LiClO_4$, LiOTf, $LiC(Tf)_3$, LiBOB, and LiDFOB. In one arrangement, the first salt and the second salt are the same.

In another embodiment of the invention, the negative electrode comprises negative electrode active material particles, a negative electrode electrolyte, and optional binder. The negative electrode active material may be any of silicon, silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr); silicon oxides; silicon carbides; graphite; and mixtures thereof.

In one arrangement, the negative electrode electrolyte includes a liquid electrolyte that is immiscible with the first block copolymer electrolyte. The liquid electrolyte may be any of ethers, alkyl carbonates, ionic liquids, and mixtures thereof. In another arrangement, the negative electrode electrolyte includes a second block copolymer electrolyte that is immiscible with the first block copolymer electrolyte.

The positive electrode may also include electronically conducting carbon such as acetylene black, vapor-grown carbon fiber, and graphite powder.

In one arrangement, the positive electrode active material includes lithium metal oxides or lithium metal phosphates. In another arrangement, the positive electrode active material includes elemental sulfur, or sulfur composites with carbon or pyrolyzed polymer.

In one arrangement, the first block copolymer electrolyte layer in contact with the negative electrode is either a diblock copolymer or a triblock copolymer. The first block of the block copolymer may be ionically conductive and may be any of polyethers, polyamines, polyimides, polyamides, poly alkyl carbonates, polynitriles, polysiloxanes, polyphosphazines, polyolefins, polydienes, and combinations thereof. In one arrangement, the first block of the block copolymer includes an ionically-conductive comb polymer that has a backbone and pendant groups. The backbone may be any of polysiloxanes, polyphosphazines, polyethers, polydienes, polyolefins, polyacrylates, polymethacrylates, and combinations thereof. The pendants may be any of oligoethers, substituted oligoethers, nitrile groups, sulfones, thiols, polyethers, polyamines, polyimides, polyamides, alkyl carbonates, polynitriles, other polar groups, and combinations thereof.

In one arrangement, the first block copolymer electrolyte layer in contact with the negative electrode has a second block that may be any of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, polyfluorocarbons, polyvinylidene fluoride, and copolymers that contain styrene, methacrylate, and/or vinylpyridine.

The optional binder in the positive electrode may be any of PVDF, P(HFP-VDF), P(CTFE-VDF), carboxymethylcellulose, and styrene-butadiene rubber.

The fluorinated liquid in the positive electrode may be any of perfluoropolyethers, mono- or diol-terminated perfluoropolyethers, alkylcarbonate-terminated perfluoropolyethers, alkylcarbamate-terminated perfluoropolyethers, poly(perfluoropolyether)acrylates, poly(perfluoropolyether) methacrylates, polysiloxanes with pendant fluorinated groups, and poly(perfluoropolyether)glycidyl ethers.

In one arrangement, the fluorinated liquid may include first polymers selected from the group consisting of polymerized versions of perfluoropolyether-acrylates, -methacrylates, and -glycidyl ethers and second polymers selected from the group consisting of polymerized versions of acrylates, methacrylates, or glycidyl ethers. The first polymers are copolymerized with the second polymers and the second polymers make up less than 10 wt % of the fluorinated liquid. In one arrangement, the fluorinated liquid has a molecular weight between 200 Da and 10,000 Da. In one arrangement, the fluorinated liquid is crosslinked. In one arrangement, the fluorinated liquid also includes one or more additives selected from the group consisting of cyclic organic carbonates, cyclic acetals, organic phosphates, cyclic organic sulfates, and cyclic organic sulfonates.

In one arrangement, the positive electrode also includes a polymer matrix into which the fluorinated liquid is absorbed to form a polymer gel electrolyte.

The electrochemical cell may also include a separator electrolyte layer between the electrolyte layer and the positive electrode. The separator electrolyte layer may include an electrolyte different the first block copolymer electrolyte. In one arrangement, the separator electrolyte may be any of ceramic electrolytes, polymer electrolytes, and block copolymer electrolytes. The separator electrolyte may be a solid electrolyte.

In another embodiment of the invention, an electrochemical cell is disclosed. The electrochemical cell has a negative electrode that includes an alkali metal film. There is a separator layer in contact with the negative electrode, and the separator layer includes a block copolymer electrolyte and a first salt comprising the alkali metal. The electrochemical cell also has a positive electrode that includes positive electrode active material, binder and a liquid electrolyte. The liquid electrolyte includes a fluorinated liquid and a second salt comprising the alkali metal. The liquid electrolyte is immiscible with the block copolymer electrolyte.

In yet another embodiment of the invention, an electrochemical cell is disclosed. The electrochemical cell has a negative electrode that includes a lithium metal film. There is a separator layer in contact with the negative electrode, and the separator layer includes a block copolymer electrolyte and a first lithium salt. The electrochemical cell also has a positive electrode that includes nickel cobalt aluminum oxide particles, binder, a second lithium salt, and a liquid electrolyte comprising a fluorinated liquid. The liquid electrolyte is immiscible with the block copolymer electrolyte.

DETAILED DESCRIPTION

The preferred embodiments are illustrated in the context of electrolytes in an electrochemical cell. The skilled artisan will readily appreciate, however, that the materials and methods disclosed herein will have application in a number of other contexts where optimizing electrochemical interactions between electrolytes and electrochemically active materials are important. These electrolytes can be useful in electrochemical devices such as capacitors, electrochemical/capacitive memory, electrochemical (e.g., dye sensitized) solar cells, and electrochromic devices.

These and other objects and advantages of the present invention will become more fully apparent from the following description taken in conjunction with the accompanying drawings.

In this disclosure, the terms "negative electrode," "NE," and "anode" are both used to mean "negative electrode." Likewise, the terms "positive electrode," "PE," and "cathode" are both used to mean "positive electrode."

In this disclosure, the term "dry polymer" is used to mean a polymer with long chains that has not been plasticized by small molecules. Organic solvents or plasticizers are not added to such dry polymers.

Although not always mentioned explicitly, it should be understood that electrolytes, as described herein, include metal salt(s), such as lithium salt(s), to ensure that they are ionically conductive. Non-lithium salts such as other alkali metal salts or salts of aluminum, sodium, or magnesium can also be used. In general, salts that contain the metal ion that shuttles back and forth during electrochemical cell cycling are the ones that are used.

Molecular weights in this disclosure have been determined by the weight-averaged method. Some abbreviations used in this disclosure are shown in Table I below.

TABLE I

| Abbreviation | Meaning |
| --- | --- |
| MPITFSI | 1-methyl-3-propylimidazolium bis(trifluoromethylsulfonyl)imide |
| PEO | poly(ethylene oxide) |
| PFPE | perfluoropolyether |
| PFA | perfluoro alkane |
| PEG | polyethylene glycol |
| PAGE | polyallyl glycidyl ether |
| PPO | polypropylene oxide |
| $^1$H NMR | proton nuclear magnetic resonance spectroscopy |
| GPC | gel permeation chromatography |
| DSC | differential scanning calorimetry |

An electrochemical cell has a negative electrode assembly and a positive electrode assembly with an ionically conductive separator in between. In one embodiment of the invention, the negative electrode assembly contains at least negative electrode active material and an electrolyte that has been chosen specifically for use with the negative electrode active material, referred to herein as the NE (negative electrode) electrolyte.

FIG. 1 illustrates various exemplary arrangements for negative electrode active material (black regions) and NE electrolyte or anolyte (grey regions). The negative electrode active material can be arranged as particles (FIGS. 1a-1d, 1f) or as a thin film or foil (FIG. 1e). The negative electrode assembly can be formed by combining the negative electrode material particles with the NE electrolyte to form a composite layer (FIGS. 1a-1d). In some arrangements, other materials (not shown) can be added to the composite layer to enhance, for example, electronic or ionic conduction. In some arrangements, the composite is porous, i.e., contains voids which are shown as white spaces in FIGS. 1b, 1d; in other arrangements, the composite is pore-free (FIGS. 1a, 1c). In yet other arrangements, the NE dry polymer electrolyte of FIGS. 1e and 1f may also contain pores (not shown). In a negative electrode assembly that has a composite layer, the NE dry polymer electrolyte may be contained entirely within the composite layer (FIGS. 1a, 1b). In another arrangement, there can be a thin layer of additional NE dry polymer electrolyte adjacent the composite layer (FIGS. 1c, 1d). In some arrangements, a current collector (shown as a white layer defined by dashed lines) is also part of the negative electrode assembly.

In arrangements where the negative electrode active material is a thin film or foil, the negative electrode assembly contains at least the thin film or foil and a layer of the NE electrolyte adjacent and in ionic contact with the thin film or foil, as shown in FIG. 1e. In some arrangements, the negative electrode material is not a solid thin film, but instead is arranged as an aggregation of negative electrode active material particles in close contact with one another to ensure ionic and electronic communication among the particles (FIG. 1f). Such a structure can be made, for example, by pressing and/or by sintering the negative electrode active material particles. In some arrangements, other materials can be added to the layer of negative electrode material particles, for example, to enhance electronic or ionic conductivity. In one arrangement carbon particles added to enhance electronic conductivity. The negative electrode assembly contains at least the NE electrolyte layer in ionic communication with the layer of negative electrode active material particles. In some arrangements there is also a current collector (shown as a white layer defined by dashed lines) in electronic contact with the negative electrode assembly.

The NE electrolyte is chosen specifically for use with the negative electrode active material. In one embodiment of the invention, the NE electrolyte is a dry polymer (a polymer with long chains that has not been plasticized by any small molecules) electrolyte. The NE electrolyte is electrochemically stable against the negative electrode active material. That is to say that the NE electrolyte is reductively stable and resistant to continuous chemical and electrochemical reactions which would cause the NE electrolyte to be reduced at its interface with the negative electrode material. The NE electrolyte is resistant to reduction reactions over the range of potentials that the electrochemical cell experiences under conditions of storage and cycling. Such reduction reactions at the negative electrode would increase cell impedance, thus adversely affecting the performance of the cell and/or the capacity of the cell. In addition, the NE electrolyte is chemically stable against the negative electrode active material.

In one embodiment of the invention, the negative electrode assembly has a thin film or foil as the negative electrode active material (as shown in FIG. 1e), and the NE dry polymer electrolyte has a high modulus in order to prevent dendrite growth from the film during cell cycling. The thin film or foil may be lithium or lithium alloy, though other metal chemistries are possible, such as sodium or magnesium. Non-lithium metals and non-lithium metal alloys would be used with corresponding electrolyte salts that include the same metal as the electrochemically active metal in the negative electrode and with appropriate active materials in the cathode that can absorb and release the same metal ions. Graphite may also be used in combination with lithium salts and lithium-based active materials in the anode for secondary cells. The NE dry polymer electrolyte also has good adhesion to the film or foil to ensure easy charge transfer and low interfacial impedance between the layers. In one arrangement, the NE dry polymer electrolyte is void free. The NE dry polymer electrolyte is electrochemically stable down to the lowest operating potential of the electrode. For example, with Li—Al planar electrodes, the NE dry polymer electrolyte is stable down to 0.3 V vs Li/Li$^+$. See Table 2 for other NE active materials and their associated potentials. In one arrangement, the NE dry polymer electrolyte is mechanically rigid enough to prevent continuous reactivity of active material particles that undergo large volume changes during cell cycling by keeping them in electrical contact with the matrix of the composite electrode. When negative electrode active materials that undergo large volume expansion upon absorption of lithium are used as thin film electrodes, it is useful if the NE dry polymer electrolyte has high yield strain to prevent electrode fatigue.

In another embodiment of the invention, the negative electrode active material is an alloy (examples of which are shown in Table 2) and has the form of particles. In order to prevent continuous reactivity, it is useful if the NE electrolyte is electrochemically stable down to the reduction potentials shown. Additionally it is useful if the NE electrolyte has high impact toughness in order to maintain mechanical integrity and high yield strain in order to accommodate the volume change of the NE active material particles as they absorb and release lithium. It is also useful if the NE electrolyte contains voids that can shrink to accommodate expansion. Good compatibility between the electrolyte and the particle surfaces helps to ensure good adhesion and homogeneous dispersion. Finally, if a current collector is used, it is useful if the NE electrolyte can adhere to the current collector.

TABLE 2

Negative Electrode Active Material Characteristics

| Negative Electrode Active Material | Reduction Potential vs. Li/Li+ (volts) | Maximum Volumetric Expansion |
|---|---|---|
| Li—Si | 0.4 | 30%-400% |
| Li—Al | 0.3 | 30%-400% |
| Li—Sn | 0.5 | 30%-450% |
| graphite | 0.2 | ~25% |

The negative electrode active material can be any of a variety of materials depending on the type of chemistry for which the cell is designed. In one embodiment of the invention, the cell is a lithium or lithium ion cell. The negative electrode material can be any material that can serve as a host material for (i.e., can absorb and release) lithium ions. Examples of such materials include, but are not limited to graphite, lithium metal, and lithium alloys such as Li—Al, Li—Si, Li—Sn, and Li—Mg. In one embodiment of the invention, a lithium alloy that contains no more than about 0.5 weight % aluminum is used. Silicon and silicon alloys are known to be useful as negative electrode materials in lithium cells. Examples include silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) and mixtures thereof. In some arrangements, graphite, metal oxides, silicon oxides or silicon carbides can also be used as negative electrode materials.

Figure 2:
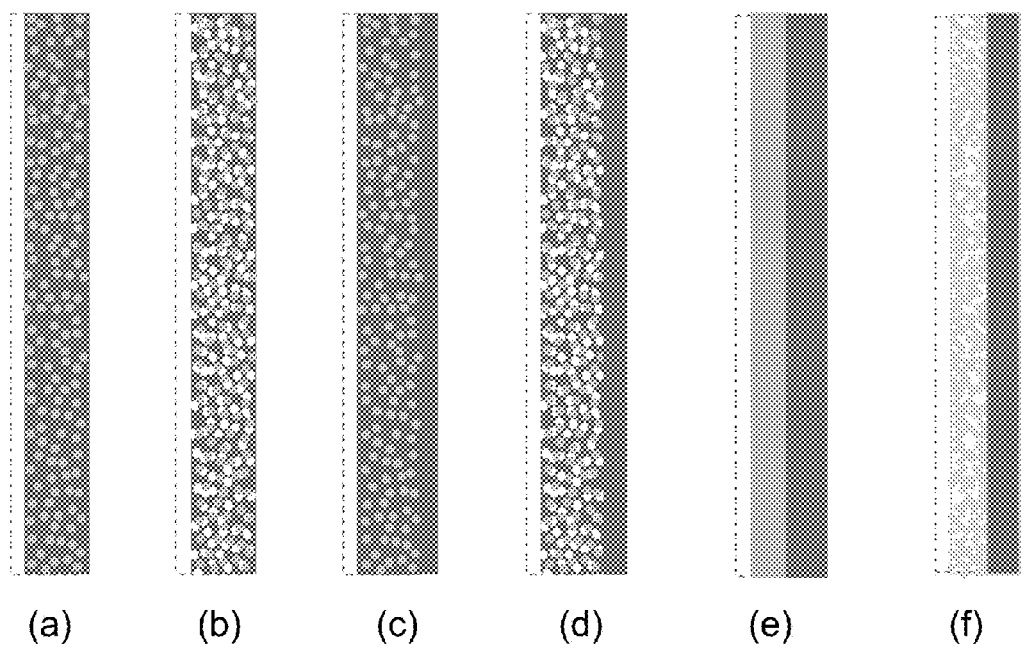
FIG. 2 is a schematic illustration of various positive electrode assemblies, according to embodiments of the invention.

In one embodiment of the invention, a positive electrode assembly contains at least positive electrode active material and an electrolyte that has been chosen specifically for use with the positive electrode active material, referred to herein as a PE (positive electrode) electrolyte. FIG. 2 illustrates various exemplary arrangements for the positive electrode active material (light grey regions) and the PE electrolyte or catholyte (dark grey regions). The positive electrode active material can be arranged as particles (FIGS. 2a-2d) or as a thin film or foil (FIG. 2e). The positive electrode assembly can be formed by combining the positive electrode material particles with the PE electrolyte to form a composite layer (FIGS. 2a-2d). In some arrangements, other materials (not shown) can be added to the composite layer to enhance, for example, electronic conduction. In some arrangements, the composite is porous, i.e., contains voids, which are shown as white spaces in FIGS. 2b, 2d; in other arrangements, it is pore-free (FIGS. 2a, 2c). In yet other arrangements (not shown), the PE electrolyte of FIGS. 2e and 2f can also contain pores (not shown). In a positive electrode assembly that has a composite layer, the PE electrolyte may be contained entirely within the composite layer (FIGS. 2a, 2b). In another arrangement, there can be a thin layer of additional PE electrolyte adjacent the composite layer (FIGS. 2c, 2d). In some arrangements, a current collector (shown as a white layer defined by dashed lines) is also part of the positive electrode assembly.

In arrangements where the positive electrode active material is a thin film or foil, the positive electrode assembly contains at least the thin film or foil and a layer of the PE electrolyte adjacent and in ionic contact with the thin film or foil as shown in FIG. 2e. In some arrangements, the positive electrode material is not a solid thin film, but instead is arranged as an aggregation of positive electrode active material particles close together to ensure ionic and electronic communication among the particles (FIG. 2f). Such a structure can be made, for example, by pressing and/or by sintering the positive electrode active material particles. In some arrangements, other materials such as carbon particles can be added to the layer of positive electrode material particles, for example, to enhance electronic or ionic conductivity. The positive electrode assembly contains at least the PE electrolyte layer in ionic communication with the layer of positive electrode active material particles. In some arrangements there is also a current collector (shown as a white layer defined by dashed lines) in electronic contact with the positive electrode.

The PE electrolyte is chosen specifically for use with the positive electrode active material. In one embodiment of the invention, the PE electrolyte is a dry polymer (a polymer with long chains that has not been plasticized by any small molecules) electrolyte. The PE electrolyte is chosen to be oxidatively stable against the positive electrode active material. That is to say that the PE electrolyte is resistant to continuous chemical and electrochemical reactions which would cause the PE electrolyte to be oxidized at its interface with the positive electrode material. The PE electrolyte is resistant to oxidation reactions over the range of potentials that the electrochemical cell experiences under conditions of storage and cycling. Such oxidation reactions at the positive electrode would increase cell impedance, thus adversely affecting the performance of the cell and/or the capacity of the cell. In addition, the PE electrolyte is chemically stable against the positive electrode active material.

The positive electrode active material can be any of a variety of materials depending on the type of chemistry for which the cell is designed. In one embodiment of the invention, the cell is a lithium or lithium ion cell. The positive electrode active material can be any material that can serve as a host material for lithium ions. Examples of such materials include, but are not limited to materials described by the general formula $Li_xA_{1-y}M_yO_2$, wherein A comprises at least one transition metal selected from the group consisting of Mn, Co, and Ni; M comprises at least one element selected from the group consisting of B, Mg, Ca, Sr, Ba, Ti, V, Cr, Mn, Fe, Co, Ni, Cu, Al, In, Nb, Mo, W, Y, and Rh; x is described by $0.05 \le x \le 1.1$; and y is described by $0 \le y \le 0.5$. In one arrangement, the positive electrode material is $LiNi_{0.5}Mn_{0.5}O_2$.

In one arrangement, the positive electrode active material is described by the general formula: $Li_xMn_{2-y}M_yO_2$, where M is chosen from Mn, Ni, Co, and/or Cr; x is described by $0.05 \le x \le 1.1$; and y is described by $0 \le y \le 2$. In another arrangement, the positive electrode active material is described by the general formula: $Li_xM_yMn_{4-y}O_8$, where M is chosen from Fe and/or Co; x is described by $0.05 \le x \le 2$; and y is described by $0 \le y \le 4$. In another arrangement, the positive electrode active material is given by the formula $Li_x(Fe_yM_{1-y})PO_4$, where M is chosen from transition metals such as Mn, Co and/or Ni; x is described by $0.9 \le x \le 1.1$; and y is described by $0 \le y \le 1$. In yet another arrangement, the positive electrode active material is given by the general formula: $Li(Ni_{0.5-x}Co_{0.5-x}M_{2x})O_2$, where M is chosen from Al, Mg, Mn, and/or Ti; and x is described by $0 \le x \le 0.2$. In some arrangements, the positive electrode material includes $LiNiVO_2$.

Examples of appropriate positive electrode active materials also include compounds such as, $FeS_2$, FeOF, $FeF_3$, $FeF_2$, $MoO_3$, sulfur, lithium polysulfides, CuO, $Cu_2O$, FeO, $Fe_2O_3$, $V_6O_{13}$, $VO_2$, $Li_{1+x}V_3O_8$ ($0 \le x \le 3$), $Ag_xV_2O_5$ ($0 < x \le 2$), $Cu_xV_4O_{11}$ ($0 < x \le 3$), $VOPO_4$, $LiCoO_2$, lithium iron phosphate (LFP), nickel-cobalt manganese (NCM), nickel cobalt aluminum (NCA), or mixtures thereof.

Most electrolytes exhibit electrochemical stability over a limited window of about 4 Volts. Thus a single electrolyte cannot by itself support an electrochemical couple that has a voltage between electrodes higher than 4 Volts. Yet such high voltage electrochemical cells can be made to be stable and robust using the structures and materials described herein. Two different electrolytes—a NE electrolyte that is reductively stable at the anode (but may or may not be oxidatively stable at the cathode) and a PE electrolyte that is oxidatively stable at the cathode (but may or may not be reductively stable at the anode) can now be used in the same electrochemical cell. In one embodiment of the invention, the NE electrolyte is optimized for reductive stability and the PE electrolyte is optimized for oxidative stability. By allowing different electrolytes to be used at the negative electrode and at the positive electrode, each electrode can be designed for optimum performance without compromise. Such an arrangement is especially useful and for high voltage applications.

There have been efforts in recent years to develop high voltage (i.e., greater than ~4.2V) electrochemical cells by using "high voltage cathode materials" such as those listed in Table 3.

TABLE 3

Positive Electrode Active Material Characteristics

| Positive Electrode Active Material | Discharge Potential vs. Li/Li+ (volts) | Typical Charging cut off Potential Li/Li+ (volts) |
|---|---|---|
| $LiFePO_4$ | 3.4 | 3.8 |
| $LiCoO_2$ | 3.6 | 4.2 |
| $LiMnPO_4$ | 4.1 | 4.3 |
| $LiAl_{0.05}Co_{0.15}Ni_{0.8}O_2$ | 3.6 | 4.3 |
| $LiCoPO_4$ | 4.8 | 5.0 |
| $LiNiPO_4$ | 5.1 | 5.4 |
| $Li_{1.07}Mn_{1.93}O_4$ | 3.9 | 4.3 |

Unfortunately, electrolytes that are stable to oxidation at the high potentials at the cathode/electrolyte interface are not generally stable to reduction at the lower potentials at the anode/electrolyte interface for standard anode materials. Now an electrochemical cell that uses different, specifically chosen electrolytes, some of which may be dry polymer electrolytes, at the cathode and at the anode sides of the cell, as described herein, can overcome this problem and make it possible to design and build high voltage cells.

Lithium metal and alloy negative electrode active materials are particularly prone to ongoing reduction reactions with many conventional lithium-ion electrolytes, as these negative electrode active materials tend not to form stable passivation layers. Although some electrolytes may be able to form stable interfaces with such anode materials, such electrolytes may not work well in the rest of the cell or in the positive electrode assembly due to limitations in conductivity and/or oxidative stability. Electrochemical cells that can use different electrolytes specifically chosen for their compatibility with each electrode, as described in the embodiments herein, can overcome these limitations.

The embodiments of the invention, as described above, can result in an electrochemical cell with very good performance. In one embodiment of the invention, such a cell has a Li cycling efficiency greater than 99.7%, over 500 cycles. In another embodiment of the invention, such a cell has a Li cycling efficiency of greater than 99.9%, over 500 cycles. In another embodiment of the invention, there is very little impedance increase at the negative electrode, the positive electrode, or at both electrodes as the cell is cycled. In one arrangement, the impedance value at 500 cycles increases by no more than 40% from the impedance value at 10 cycles. In another arrangement, the impedance value at 500 cycles increases by no more than 20% from the impedance value at 10 cycles. In yet another arrangement, the impedance value at 500 cycles increases by no more than 10% from the impedance value at 10 cycles. In one embodiment of the invention, the capacity of the electrolyte cell at 500 cycles decreases by no more than 40% from the capacity at 10 cycles. In another embodiment of the invention, the capacity of the electrolyte cell at 500 cycles decreases by no more than 20% from the capacity at 10 cycles. In yet another embodiment of the invention, the capacity of the electrolyte cell at 500 cycles decreases by no more than 10% from the capacity at 10 cycles. In yet another embodiment of the invention, the capacity of the electrolyte cell at 500 cycles decreases by no more than 5% from the capacity at 10 cycles.

When negative and positive electrode assemblies are each optimized independently, not only is it possible to optimize electrochemical stability, but it also presents the opportunity to overcome other key limitations that may be specific to individual electrode active materials.

For example, some negative electrode active materials undergo a large volume increase, as much as 300% or more, upon lithiation. Some examples are shown above in Table 2. For composite negative electrode assemblies that contain voids such as the electrode assemblies in FIGS. 1b, 1d, it is possible to accommodate volumetric expansion and contraction of the negative electrode active material upon cycling. It is useful if the NE electrolyte is a dry polymer electrolyte that has a yield strain greater than or equal to the maximum volume expansion of the negative electrode material. In this way, the NE electrolyte is elastic enough to move into the void space as the negative electrode active material expands. It is also useful if the total void space is at least as large as the maximum total volume expansion of the negative electrode active material. In other arrangements, the negative electrode material particles are shaped into a porous layer adjacent the NE electrolyte layer to form the negative electrode assembly as shown in FIG. 1f. The pores in the layer can accommodate expansion of the negative electrode active material. Further details about porous electrodes can be found in U.S. Pat. No. 9,054,372, issued Jun. 9, 2015, which is included by reference herein.

In general, cathode active materials expand and contract much less during cell cycling than do anode active materials. Thus there are different mechanical considerations when choosing an electrolyte for a cathode rather than for an anode, and it may be desirable to choose different electrolytes for these two regions of an electrochemical cell. For example, if the positive electrode active material expands and contracts much less than the negative electrode active material, it may be optimal to employ an electrolyte that is less elastic for the cathode region of the cell or to create an electrode assembly for the cathode that does not include voids, thereby optimizing other key parameters in the cathode assembly such as mechanical robustness or energy density. One key factor in determining a good PE dry polymer electrolyte is whether the electrolyte can bind and keep the positive active material particles and any electronically conductive additives (e.g., carbon particles) intermixed and randomly dispersed through the manufacturing (e.g., casting, calendering) process despite significant difference in the densities of the particles.

For positive electrode active materials that contain transition metals, dissolution of these metals into a standard liquid electrolyte upon cycling can be a serious problem, especially in high voltage cells and at high temperatures. The dissolution can cause accelerated cell degradation or premature failure. Examples of possible failure mechanisms include:

a) the composition of the positive electrode active materials changes as the metals dissolve, adversely impacting the ability of the active material to absorb and release lithium, b) the dissolved metals can diffuse to the negative electrode and degrade the capacity of the negative electrode active material, c) the dissolved metals can diffuse to the negative electrode and degrade any passivation layer on the negative electrode active material, resulting in continual electrolyte reaction with the negative electrode active material, and d) the dissolved metals can create internal shorts or other defects within the cell.

For example, in the case of $Mn_2O_4$ positive electrode active material, it is useful if the electrolyte does not dissolve the electrochemically active manganese. In the case of a sulfur cathode, it is useful if the electrolyte does not dissolve the electrochemically active sulfur or polysulfide. In one arrangement, less than 10% of the electrochemically active ion dissolves from the positive electrode active material after 500 cycles in the temperature range 45-80° C. In another arrangement, less than 5% of the electrochemically active ion dissolves from the positive electrode active material after 500 cycles in the temperature range 45-80° C. In yet another arrangement, less than 1% of the electrochemically active ion dissolves from the positive electrode active material after 500 cycles in the temperature range 45-80° C. This allows for selection of a separate non-dissolving electrolyte on the cathode side and can prevent diffusion of metal to the anode. A positive electrode assembly can be optimized to prevent dissolution, for example, employing a ceramic or solid polymer electrolyte as the PE electrolyte. Although dissolution of electrochemically active ions may not be an issue for the negative electrode assembly, other considerations may be important, such as high ionic conductivity or reductively stability, and it may be possible that a different electrolyte would be preferred.

In one embodiment of the invention, the NE electrolyte and/or the PE electrolyte is a solid electrolyte. In one arrangement, the NE electrolyte and/or the PE electrolyte is a ceramic electrolyte. In another arrangement, the NE electrolyte and/or the PE electrolyte is a dry polymer electrolyte. In yet another arrangement, the NE electrolyte and/or the PE electrolyte is a dry block copolymer electrolyte.

In one embodiment of the invention, the NE electrolyte and/or the PE electrolyte is a liquid electrolyte or a gel containing a liquid electrolyte. When a liquid electrolyte is used, it is most useful if the liquid electrolyte is immiscible with electrolytes in adjacent regions of the cell or if a selectively permeable membrane is positioned to prevent mixing of the liquid electrolyte with adjacent electrolytes. Such a membrane allows electrochemical cations to move through, but not the liquid itself. In the absence of containment by such a membrane, miscible liquids can diffuse easily throughout the cell. If such diffusion were to occur, the benefits provided by using different electrolytes in different regions of the cell may be diminished or negated. In the worst case, active materials in the electrodes could be oxidized or reduced, seriously compromising the performance and/or the life of the cell.

In one embodiment of the invention, a separator electrolyte is used between the negative electrode assembly and the positive electrode assembly. In one embodiment of the invention, the separator electrolyte can be the same as either the NE electrolyte or as the PE electrolyte. In another embodiment, the separator electrolyte is different from both the NE electrolyte and the PE electrolyte. The separator electrolyte can be any of liquid electrolytes, solid electrolytes, ceramic electrolytes, polymer electrolytes, dry polymer electrolytes, and block copolymer electrolytes, independent of the NE electrolyte and the PE electrolyte. In some arrangements, the electrolytes are chosen so that no two liquid electrolytes are adjacent one another. When a liquid electrolyte is used, it is most useful if the liquid electrolyte is immiscible with electrolytes in adjacent regions of the cell or if a selective membrane is positioned at each interface to prevent mixing of the liquid electrolyte with adjacent electrolytes. Such a membrane allows electrochemical cations to move through but not the liquid itself. In the absence of containment, miscible liquids can diffuse easily throughout the cell. If such diffusion were to occur, the benefits provided by using different electrolytes in different regions of the cell may be diminished or negated. In the worst case, such diffusion could cause reduction at the negative electrode assembly and/or oxidation at the positive electrode assembly, causing premature failure of the cell.

In general, it is useful if the separator electrolyte has enough mechanical integrity to ensure that the negative electrode assembly and the positive electrode assembly do not come into physical contact with one another. In some arrangements, when a liquid, gel, or soft polymer is used as the separator electrolyte, a separator membrane is used with it.

It is useful if any two electrolytes meeting at an interface are immiscible in each other and chemically compatible with each other. It is also useful if there is little or no impedance or concentration overpotential across the interface.

In one arrangement, all electrolytes are stable over the range of storage and operating temperatures and the range of operating potentials for the electrochemical cell. Using the embodiments described here, this condition can be met for electrode couples that are otherwise unstable with conventional electrolytes or in conventional single-electrolyte architectures.

Figure 3:
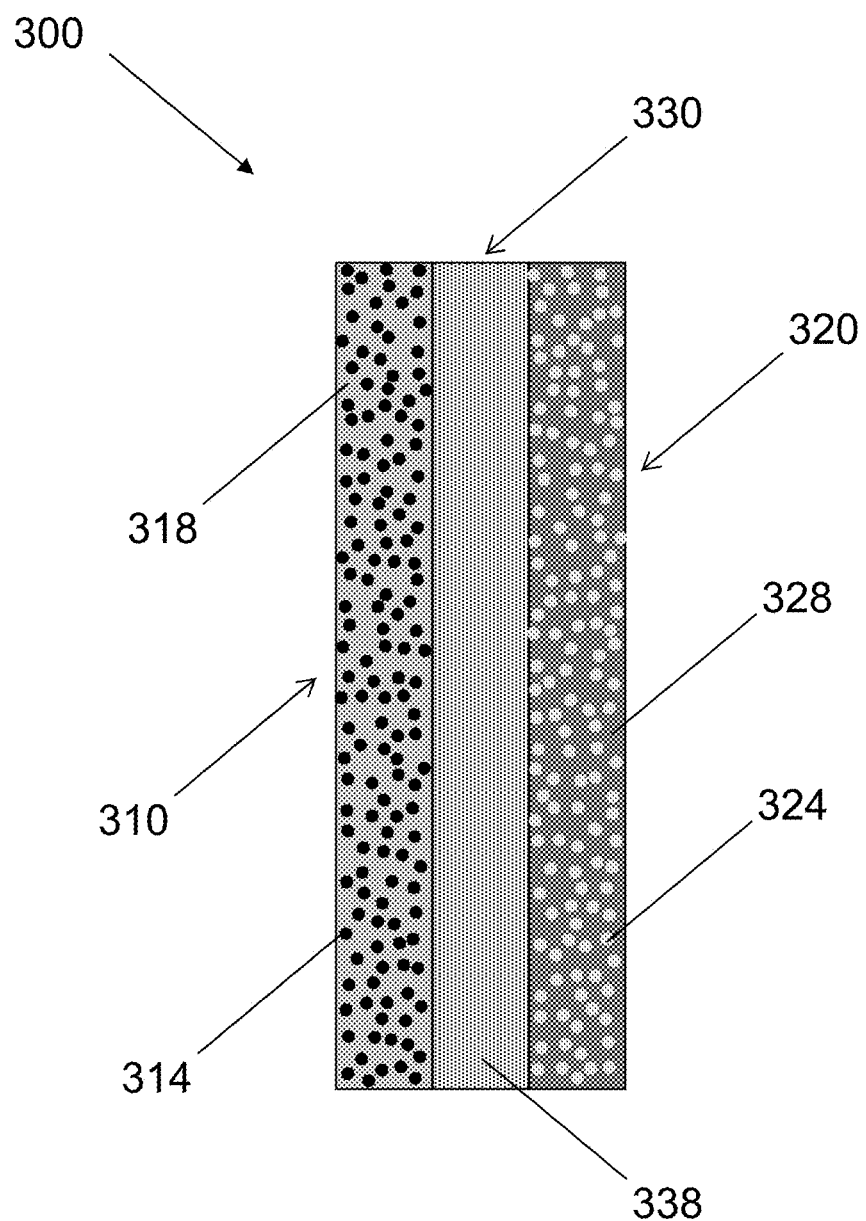
FIG. 3 is a schematic illustration of an electrochemical cell, according to an embodiment of the invention.

FIG. 3 is a schematic cross section that shows an electrochemical cell in an exemplary embodiment of the invention. The cell 300 has a negative electrode assembly 310, a positive electrode assembly 320, with an intervening separator 330. The exemplary negative electrode assembly 310 is the same as the one shown in FIG. 1a. The negative electrode assembly 310 is an aggregation of negative electrode active material particles 314 dispersed within a NE dry polymer electrolyte 318. There can also be electronically-conducting particles such as carbon particles (not shown) in the negative electrode assembly 310. The exemplary positive electrode assembly 320 is the same as the one shown in FIG. 2a. The positive electrode assembly 320 is an aggregation of positive electrode active material particles 324 dispersed within a PE dry polymer electrolyte 328. There can also be electronically-conducting particles such as carbon particles (not shown) in the positive electrode assembly 320. In other exemplary embodiments, other electrode assembly configurations, such as those shown in FIGS. 1 and 2, can be substituted in the electrochemical cell shown in FIG. 3.

The NE electrolyte 318 and the PE electrolyte 328 are each optimized for their respective electrodes as has been discussed above. In one arrangement, the NE electrolyte 318 and the PE electrolyte 328 are different. In another arrangement, the NE electrolyte 318 and the PE electrolyte 328 are the same. The separator 330 contains a separator electrolyte 338, which is also optimized for its role in the cell 300. In one arrangement, the separator electrolyte 338 is immiscible with both the NE electrolyte 318 and the PE electrolyte 328. In another arrangement, the separator electrolyte 338 is miscible with either or both of the NE electrolyte 318 and the PE electrolyte 328, and selectively permeable membranes (not shown) are positioned at interfaces between the miscible electrolytes. In one arrangement, the separator electrolyte 338 is the same as either the NE electrolyte 318 or the PE electrolyte 328. In another arrangement, the separator electrolyte 338 is different from both the NE electrolyte 318 and the PE electrolyte 328.

In one arrangement, the NE electrolyte 318, the PE electrolyte 328, and the separator electrolyte 338 are all solid electrolytes. In some arrangements, solid electrolytes can be made of ceramic materials or polymer materials. In one arrangement, solid electrolytes can be made of dry polymer materials. In one arrangement, the solid electrolytes are block copolymer electrolytes. In some arrangements, one or more of the NE electrolyte 318, the PE electrolyte 328, and the separator electrolyte 338 is a liquid. When a liquid electrolyte is used, care must be taken to ensure that the liquid cannot diffuse out of its own functional region (i.e., negative electrode assembly, positive electrode assembly, or separator) into other functional regions of the cell. In some arrangements, a selectively permeable membrane is used at any interface where at least one electrolyte is liquid. In other arrangements, the liquid electrolytes that are used are immiscible with any adjacent electrolyte.

Figure 4:
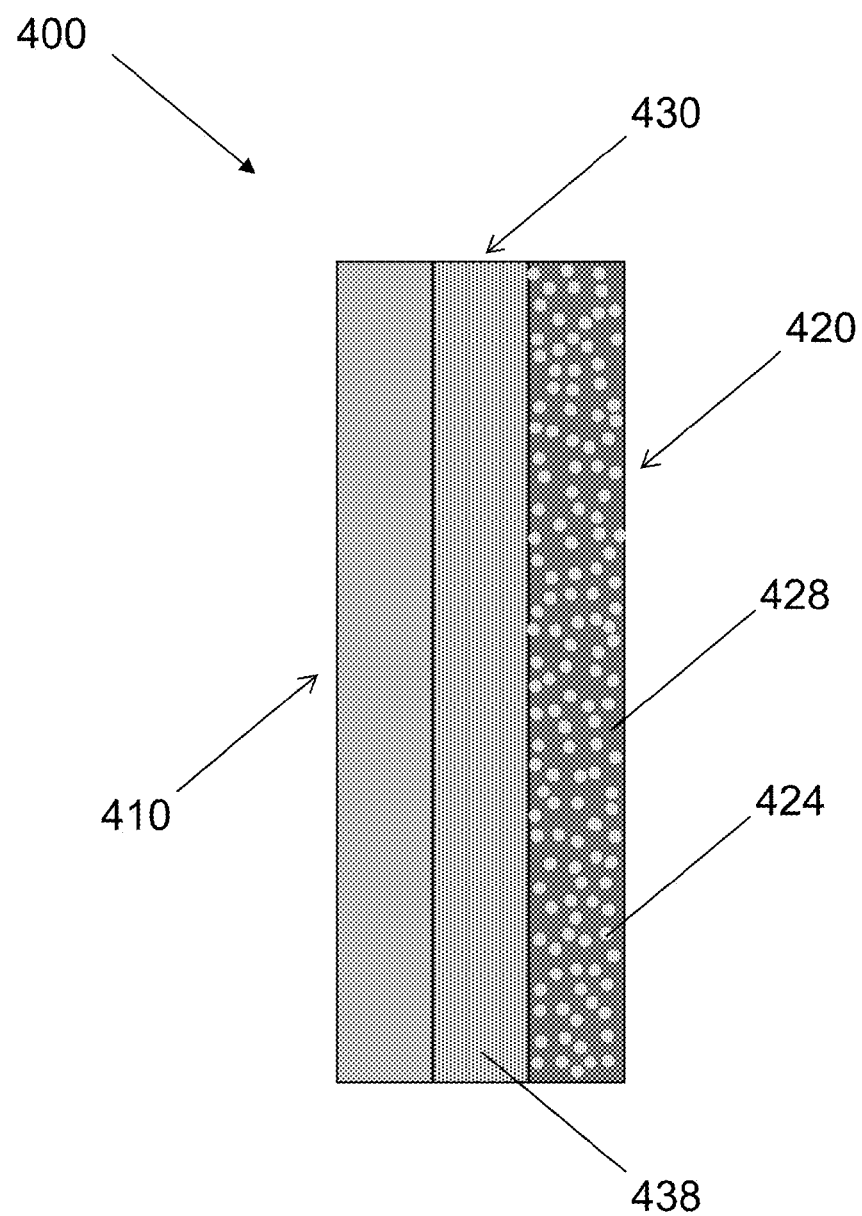
FIG. 4 is a schematic illustration of an electrochemical cell, according to another embodiment of the invention.

FIG. 4 is a schematic cross section that shows an electrochemical cell in another exemplary embodiment of the invention. The cell 400 has a negative electrode 410, a positive electrode assembly 420, with an intervening separator 430. The exemplary negative electrode 410 is a lithium metal or lithium metal alloy foil. The exemplary positive electrode assembly 420 is an aggregation of positive electrode active material particles 424 held together by a binder (not shown) such as one or more of PVDF, P(HFP-VDF), P(CTFE-VDF), carboxymethylcellulose, and styrene-butadiene rubber, and surrounded by a fluorinated liquid electrolyte 428. There can also be electronically-conducting particles such as carbon particles (not shown) in the positive electrode assembly 420. The electronically-conducting particles may be acetylene black, vapor-grown carbon fiber, or graphite powder, and are present in sufficient quantity to allow electronic conduction throughout the cathode.

The separator 430 contains a separator electrolyte 438, which is immiscible with the PE electrolyte 428. In another arrangement, the separator electrolyte 438 is miscible with the PE electrolyte 428, and a selectively permeable membrane (not shown) is positioned at the interface between the miscible electrolytes. In one arrangement, the separator electrolyte 438 is a block copolymer electrolyte as discussed above. In one arrangement, the separator electrolyte 438 is a diblock or triblock copolymer wherein one block is poly(ethylene oxide) to provide ionic conduction and the other block is poly(styrene) or other physically robust polymer providing structural support. In some arrangements, the separator electrolyte 438 is made of ceramic materials or polymer materials. In one arrangement, the separator electrolyte 438 can be made of dry polymer materials. In one arrangement, the solid electrolytes are block copolymer electrolytes. In some arrangements, the separator electrolyte 438 is a liquid. When a liquid electrolyte is used, care must be taken to ensure that the liquid cannot diffuse out of the separator region into other functional regions of the cell. In some arrangements, a selectively permeable membrane is used at any interface where at least one electrolyte is liquid. In other arrangements, the liquid electrolytes that are used are immiscible with any adjacent electrolyte.

The metal salt in the separator is typically a lithium salt with a weakly coordinating anion, such as LiTFSI, $LiPF_6$, $LiBF_4$, $LiClO_4$, LiOTf, $LiC(Tf)_3$, LiBOB, LiDFOB, $LiB(CN)_4$ among others.

The active material in the cathode is selected from the lithium metal oxides or lithium metal phosphates typically used for lithium batteries. It may be possible to use conversion electrodes such as elemental sulfur, or sulfur composites with carbon or ionically-conductive polymer.

The metal salt in the cathode is typically identical to one or more of the salts present in the block copolymer separator. A fluorinated counter-ion is more likely to be soluble at useful levels in the fluorinated liquid such as many of the salts listed above.

Electrolytes that can be Used in the Embodiments of the Invention

Ceramic Electrolytes

Examples of ceramic electrolytes that can be used in the embodiments of the invention include lithium silicate, lithium borate, lithium aluminate, lithium phosphate, lithium phosphorus oxynitride, lithium silicosulfide, lithium borosulfide, lithium aluminosulfide, and lithium phosphosulfide. Other examples include lithium lanthanum titanium oxide, lithium lanthanum zirconium oxide, LiPON, LiSICON, $Li_{10}SnP_2S_{12}$, $Li_{11}Si_2PS_{12}$, $Li_{10}GeP_2S_{12}$, $Li_2S-SiS_2-Li_3PO_4$, $Li_{14}Zn(GeO_4)_4$, $Li_2S-P_2S_5$, $La_{0.5}Li_{0.5}TiO_3$, combinations thereof, and others known in the field.

Polymer Electrolytes

There are a variety of polymer electrolytes that are appropriate for use in the inventive structures described herein. In one embodiment of the invention, an electrolyte contains one or more of the following optionally cross-linked polymers: polyethylene oxide, polysulfone, polyacrylonitrile, siloxane, polyether, polyamine, linear copolymers containing ethers or amines, ethylene carbonate, Nafion®, and polysiloxane grafted with small molecules or oligomers that include polyethers and/or alkylcarbonates.

In one embodiment of the invention, the solid polymer electrolyte, when combined with an appropriate salt, is chemically and thermally stable and has an ionic conductivity of at least $10^{-5}$ $Scm^{-1}$ at a desired operating temperature. In one arrangement, the polymer electrolyte has an ionic conductivity of at least $10^{-3}$ $Scm^{-1}$ at operating temperature. Examples of useful operating temperatures include room temperature (25° C.), and 80° C. Examples of appropriate salts for any electrolyte disclosed herein include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Alkali metal salts such as lithium salts, sodium salts, potassium salts, and cesium salts can be used. Examples of specific lithium salts include LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, $LiN(SO_2CF_3)_2$, $LiN(SO_2CF_2CF_3)_2$, lithium alkyl fluorophosphates, lithium oxalatoborate, as well as other lithium bis (chelato)borates having five to seven membered rings, $LiPF_3(C_2F_5)_3$, $LiPF_3(CF_3)_3$, $LiB(C_2O_4)_2$, LiOTf, $LiC(Tf)_3$, LiDFOB, LiTCB and mixtures thereof. In other embodiments of the invention, for other electrochemistries, electrolytes are made by combining the polymers with various kinds of salts. Examples include, but are not limited to $AgSO_3CF_3$, NaSCN, $NaSO_3CF_3$, KTFSI, NaTFSI, $Ba(TFSI)_2$, $Pb(TFSI)_2$, and $Ca(TFSI)_2$. Concentration of metal salts in the electrolytes disclosed herein range from 5 to 50 wt %, 5 to 30 wt %, 10 to 20 wt %, or any range subsumed therein. As described in detail above, a block copolymer electrolyte can be used in the embodiments of the invention.

Block Copolymer Electrolytes

Figure 5A:
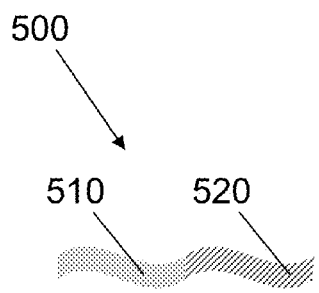
FIG. 5A is a simplified illustration of an exemplary diblock polymer molecule.

FIG. 5A is a simplified illustration of an exemplary diblock polymer molecule 500 that has a first polymer block 510 and a second polymer block 520 covalently bonded together. In one arrangement both the first polymer block 510 and the second polymer block 520 are linear polymer blocks. In another arrangement, either one or both polymer blocks 510, 520 has a comb structure. In one arrangement, neither polymer block is cross-linked. In another arrangement, one polymer block is cross-linked. In yet another arrangement, both polymer blocks are cross-linked.

Figure 5B:
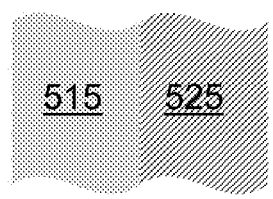
FIG. 5B is a simplified illustration of multiple diblock polymer molecules as shown in FIG. 5A arranged to form a domain structure
Figure 5C:
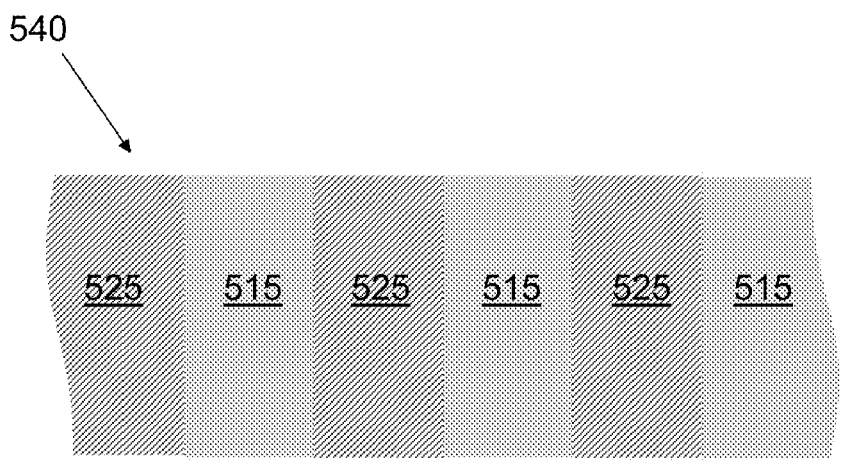
FIG. 5C is a simplified illustration of multiple domain structures as shown in FIG. 5B arranged to form multiple repeat domains, thereby forming a continuous nanostructured block copolymer material.

Multiple diblock polymer molecules 500 can arrange themselves to form a first domain 515 of a first phase made of the first polymer blocks 510 and a second domain 525 of a second phase made of the second polymer blocks 520, as shown in FIG. 5B. Diblock polymer molecules 500 can arrange themselves to form multiple repeat domains, thereby forming a continuous nanostructured block copolymer material 540, as shown in FIG. 5C. The sizes or widths of the domains can be adjusted by adjusting the molecular weights of each of the polymer blocks.

In one arrangement the first polymer domain 515 is ionically conductive, and the second polymer domain 525 provides mechanical strength to the nanostructured block copolymer.

Figure 6A:
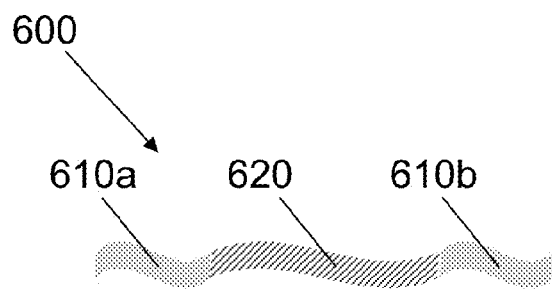
FIG. 6A is a simplified illustration of an exemplary triblock polymer molecule, wherein two blocks are the same.

FIG. 6A is a simplified illustration of an exemplary triblock polymer molecule 600 that has a first polymer block 610a, a second polymer block 620, and a third polymer block 610b that is the same as the first polymer block 610a, all covalently bonded together. In one arrangement the first polymer block 610a, the second polymer block 620, and the third copolymer block 610b are linear polymer blocks. In another arrangement, either some or all polymer blocks 610a, 620, 610b have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 6B:
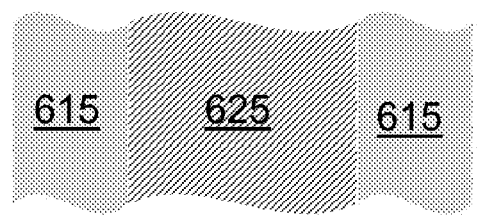
FIG. 6B is a simplified illustration of multiple triblock polymer molecules as shown in FIG. 6A arranged to form a domain structure
Figure 6C:
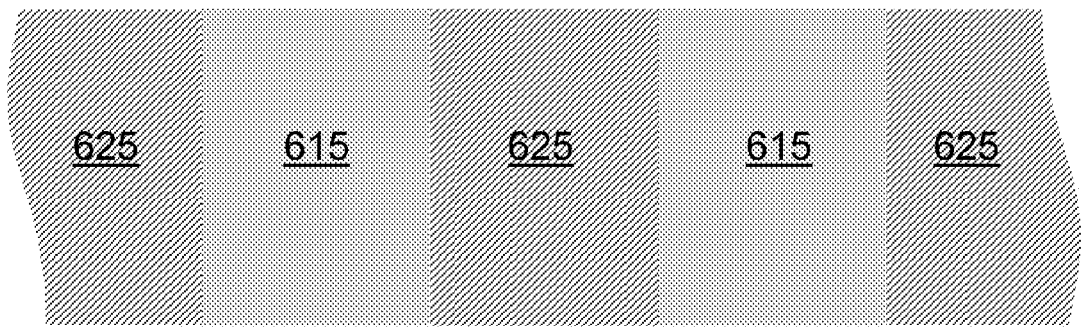
FIG. 6C is a simplified illustration of multiple domain structures as shown in FIG. 6B arranged to form multiple repeat domains, thereby forming a continuous nanostructured block copolymer material.

Multiple triblock polymer molecules 600 can arrange themselves to form a first domain 615 of a first phase made of the first polymer blocks 610a, a second domain 625 of a second phase made of the second polymer blocks 620, and a third domain 615b of a first phase made of the third polymer blocks 610b as shown in FIG. 6B. Triblock polymer molecules 600 can arrange themselves to form multiple repeat domains 625, 615 (containing both 615a and 615b), thereby forming a continuous nanostructured block copolymer 630, as shown in FIG. 6C. The sizes of the domains can be adjusted by adjusting the molecular weights of each of the polymer blocks.

In one arrangement the first and third polymer domains 615a, 615b are ionically conductive, and the second polymer domain 625 provides mechanical strength to the nanostructured block copolymer. In another arrangement, the second polymer domain 625 is ionically conductive, and the first and third polymer domains 615 provide a structural framework.

Figure 7A:
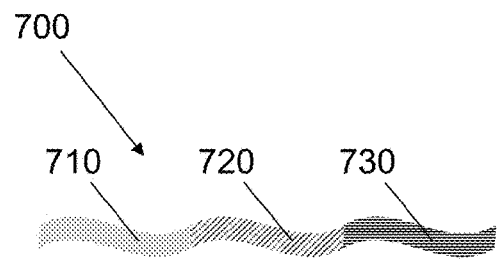
FIG. 7A is a simplified illustration of an exemplary triblock polymer molecule, wherein no two blocks are the same.

FIG. 7A is a simplified illustration of another exemplary triblock polymer molecule 700 that has a first polymer block 710, a second polymer block 720, and a third polymer block 730, different from either of the other two polymer blocks, all covalently bonded together. In one arrangement the first polymer block 710, the second polymer block 720, and the third copolymer block 730 are linear polymer blocks. In another arrangement, either some or all polymer blocks 710, 720, 730 have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 7B:
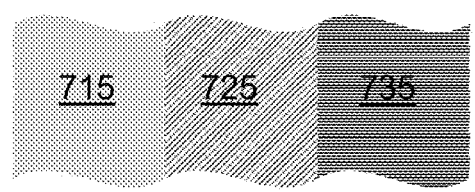
FIG. 7B is a simplified illustration of multiple triblock polymer molecules as shown in FIG. 7A arranged to form a domain structure
Figure 7C:
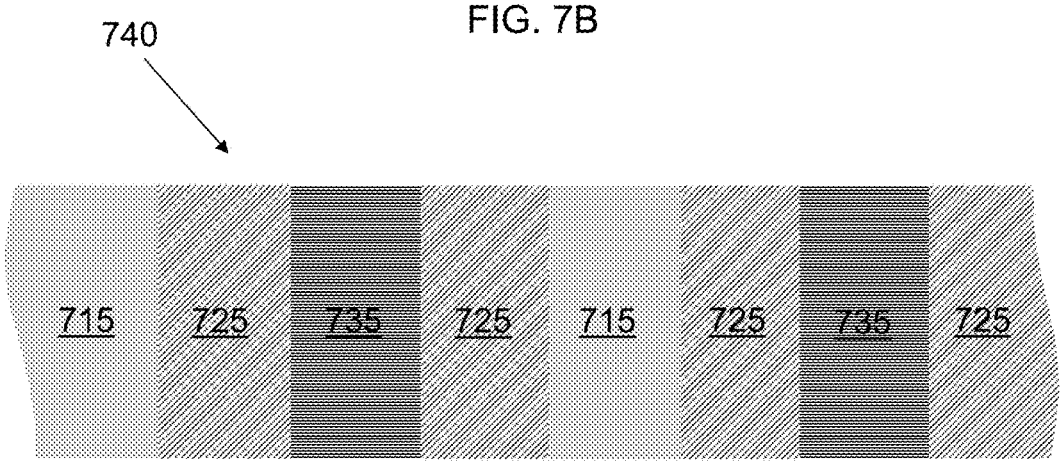
FIG. 7C is a simplified illustration of multiple domain structures as shown in FIG. 7B arranged to form multiple repeat domains, thereby forming a continuous nanostructured block copolymer material.

Multiple triblock polymer molecules 700 can arrange themselves to form a first domain 715 of a first phase made of the first polymer blocks 710a, a second domain 725 of a second phase made of the second polymer blocks 720, and a third domain 735 of a third phase made of the third polymer blocks 730 as shown in FIG. 7B. Triblock polymer molecules 700 can arrange themselves to form multiple repeat domains, thereby forming a continuous nanostructured block copolymer 740, as shown in FIG. 7C. The sizes of the domains can be adjusted by adjusting the molecular weights of each of the polymer blocks.

In one arrangement the first polymer domains 715 are ionically conductive, and the second polymer domains 725 provide mechanical strength to the nanostructured block copolymer. The third polymer domains 735 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer exhibits ionic conductivity of at least $10^{-5}$ $Scm^{-1}$ at electrochemical cell operating temperatures when combined with an appropriate salt(s), such as lithium salt(s); is chemically stable against such salt(s); and is thermally stable at electrochemical cell operating temperatures. In one embodiment, the structural material has a modulus in excess of $1 \times 10^5$ Pa at electrochemical cell operating temperatures. In one embodiment, the third polymer is rubbery; and has a glass transition temperature lower than operating and processing temperatures. It is useful if all materials are mutually immiscible.

In one embodiment of the invention, the conductive phase can be made of a linear polymer. Conductive linear polymers that can be used in the conductive phase include, but are not limited to, polyethers, polyamines, polyimides, polyamides, alkyl carbonates, polynitriles, and combinations thereof. The conductive linear polymers can also be used in combination with polysiloxanes, polyphosphazines, polyolefins, and/or polydienes to form the conductive phase.

In another exemplary embodiment, the conductive phase is made of comb polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, single ion conducting groups, and combinations thereof.

Further details about polymers that can be used in the conductive phase can be found in International Patent Application Publication Number WO 2009/146340, published Dec. 23, 2009, U.S. Pat. No. 8,691,928, issued Apr. 8, 2014, International Patent Application Publication Number WO 2010083325, published Jul. 22, 2010, International Patent Application Publication Number WO 2010/083330, published Jul. 22, 2010, U.S. Pat. No. 9,048,507, issued Jun. 2, 2015, and U.S. Pat. No. 8,598,273, issued Dec. 3, 2013, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof. Non-lithium salts such as salts of aluminum, sodium, and magnesium are examples of other salts that can be used.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+ [salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

In one embodiment of the invention, neither small molecules nor plasticizers are added to the block copolymer electrolyte and the block copolymer electrolyte is a dry polymer.

Further details about block copolymer electrolytes are described in U.S. Pat. No. 8,563,168, issued Oct. 22, 2013, U.S. Pat. No. 8,268,197, issued Sep. 18, 2012, and U.S. Pat. No. 8,889,301, issued Nov. 18, 2014, all of which are included by reference herein.

Fluorinated Polymer Electrolytes

Fluorinated polymer electrolytes can be used in cells that have multiple electrolyte layers. Fluorinated electrolytes are typically immiscible with non-fluorinated electrolytes, so they can be confined to one region or layer of a cell easily. In various embodiments fluorinated electrolytes may include polymers, dry polymers, liquids, and gels, all of which can be used cells that have multiple electrolyte layers.

In one embodiment of the invention, an electrolyte made from an ionically-conductive alternating copolymer that includes both fluorinated polymer segments and non-fluorinated polymer segments is used either alone or as one block of a block copolymer electrolyte, for example with a second rigid mechanical block. The non-fluorinated segments may be carbonate or PEO, or both. If the molecular weight of the copolymer is low (for example, less than 5000 Da), the copolymer may be a liquid at operating temperatures. At high molecular weights, the copolymer may be a solid. In one embodiment, a liquid plasticizer is added to the copolymer to make a gel electrolyte. Exemplary liquid additives include fluorinated materials and room-temperature ionic liquids.

Formation of PFPE-PEO Alternating Copolymers

In one embodiment of the invention, an alternating copolymer based on PFPE and PEO can be obtained by reacting a PFPE-diol (nucleophile) with an electrophilic PEG molecule as shown in Scheme 1 below. This reaction uses a base to activate the alcohols in PFPE. The molecular weight of the resulting copolymer can be tuned by controlling the stoichiometry between the PFPE nucleophile and PEO-based electrophile. The relative amounts of PFPE and PEG in the final copolymer can be controlled by varying the molecular weight of the two components. The PEO may have a molecular weight between 200 and 400,000 Da or any range subsumed therein. The fluorinated polymer segments may have molecular weights between 200 and 400,000 Da or any range subsumed therein. PFPE-PEO alternating copolymers may be solid, gels, or liquids depending on their molecular weights.

Scheme 1 below can be used to synthesize other variations of PEG or PEO such as polypropylene oxide (PPO) or polyallyl glycidyl ether (PAGE). Values for r can range from 1 to 10,000; for s from 1 to 10,000; and for t from 1 to 10,000. Also, PEO with small amounts of cross-linkable monomers can be utilized to achieve a cross-linked electrolyte. Examples of such cross-linkable monomers (such as X) include, but are not limited to, oxiranes with pendant epoxide groups, allyl groups, acrylate groups, methacrylate groups, and combinations thereof.

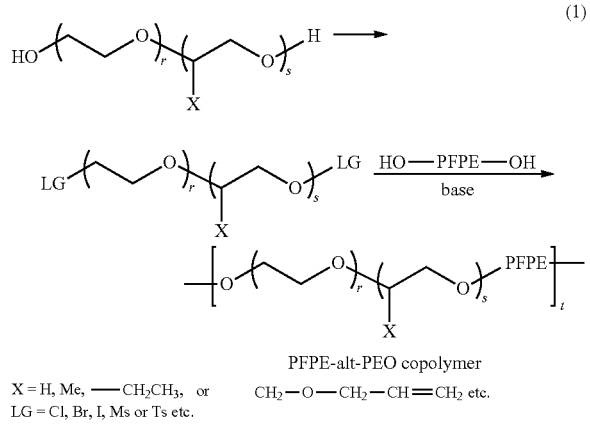

(1)

PFPE-alt-PEO copolymer

X = H, Me, —CH₂CH₃, or  CH₂—O—CH₂—CH=CH₂ etc.
LG = Cl, Br, I, Ms or Ts etc.

In one embodiment of the invention, an alternating copolymer based on PFPE and PEO can be obtained by reacting a PFPE-methyl ester with PEG diamine molecule as shown in Scheme 2 below. This reaction uses amine function groups on PEG to react with methyl esters on PFPE to form amide linkages. The molecular weight of the resulting copolymer can be tuned by controlling the stoichiometry between the PFPE methyl ester and PEO-based diamine. The relative amounts of PFPE and PEG in the final copolymer can be controlled by varying the molecular weights of the two components. The PEO may have a molecular weight between 200 and 400,000 Da or any range subsumed therein. The fluorinated polymer segments may have molecular weights between 200 and 400,000 Da or any range subsumed therein. PFPE-PEO alternating copolymers may be solid, gels, or liquids depending on their molecular weights.

Scheme 2 below can be used to synthesize variations of PEG or PEO such as polypropylene oxide (PPO) or polyallyl glycidyl ether (PAGE) with diamine functional groups. The PEG or PEO diamine can be reacted with ester-functionalized PFPE to form amide linkages between the PEG or PEO and the PFPE. Values for r can range from 1 to 10,000; for s from 1 to 10,000; and for t from 1 to 10,000. Also, PEO or PEG with small amounts of cross-linkable monomers (such as X) can be utilized to achieve a cross-linked electrolyte. Examples of such cross-linkable monomers include, but are not limited to, oxiranes with pendant epoxide groups, allyl groups, acrylate groups, methacrylate groups, and combinations thereof.

In other arrangements, fluorinated polymers other than PFPE can be used to form alternating copolymers with PEO. Examples include, but are not limited to, fluoropolyethers and perfluoropolyethers, poly(perfluoroalkyl acrylate), poly (perfluoroalkyl methacrylate), polytetrafluoroethylene, polychlorotrifluoroethylene, and polyvinylidene fluoride, and combinations thereof.

Examples of perfluoropolyethers include but are not limited to polymers that include a segment such as a difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide segments and combinations thereof.

In one embodiment of the invention, alternating copolymers based on PFPE and PEO are combined with metal salts to form ionically-conductive electrolytes. Some useful metal salts are listed herein.

Formation of PFPE-Carbonate Alternating Copolymers

Scheme 3 below describes syntheses of PFPE-carbonate alternating copolymers using a simple polycondensation involving dimethyl carbonate and PFPE-diol. This reaction uses a catalytic amount of a base such as KOH or NaOH to activate the hydroxyl groups in PFPE. Values for z can range from 1 to 10,000. By controlling the molecular weight of PFPE, the ratio of PFPE to carbonate can be controlled, which in turn can be used to tune the dielectric constant of the final material. Instead of using dimethyl carbonate, phosgene (ClC(O)Cl) can be used to generate the copolymer, however; excess base is used to scavenge HCl, which is liberated during the reaction.

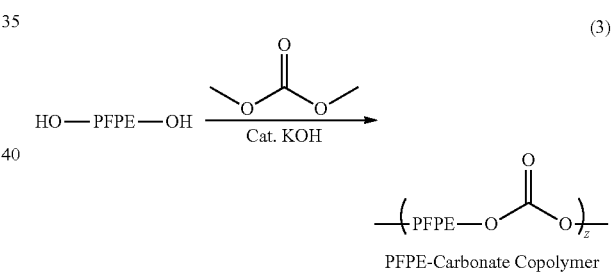

(3)

PFPE-Carbonate Copolymer

In other arrangements, fluorinated polymers other than PFPE can be used to form alternating copolymers with carbonate. Examples include, but are not limited to, fluo- (2)

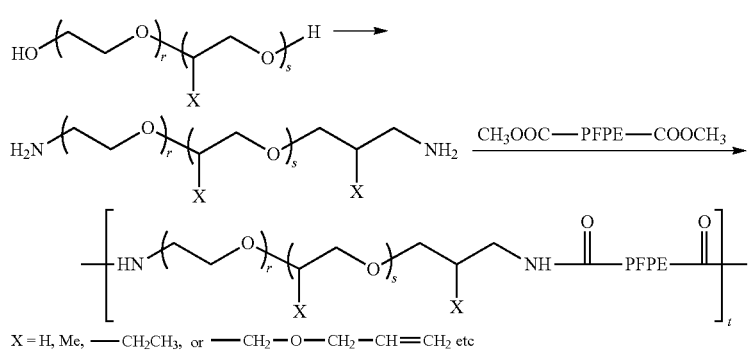

X = H, Me, —CH₂CH₃, or  —CH₂—O—CH₂—CH=CH₂ etc ropolyethers and perfluoropolyethers, poly(perfluoroalkyl acrylate), poly(perfluoroalkyl methacrylate), polytetrafluoroethylene, polychlorotrifluoroethylene, and polyvinylidene fluoride, and combinations thereof.

The fluorinated polymer segments may have molecular weights between 200 and 400,000 Da or any range subsumed therein. PFPE-carbonate alternating copolymers may be solid, gels, or liquids depending on their molecular weights.

In one embodiment of the invention, alternating copolymers based on PFPE and carbonate are combined with metal salts to form ionically-conductive electrolytes. Some useful metal salts are listed herein.

Formation of PFPE-Carbonate-PEO Alternating Copolymers

Scheme 4 below describes syntheses of PFPE-carbonate-PEO alternating copolymers using a simple polycondensation involving dimethyl carbonate, PEO-diol, and PFPE-diol. Values for x can range from 5 to 10,000 and for y from 1 to 1,000.

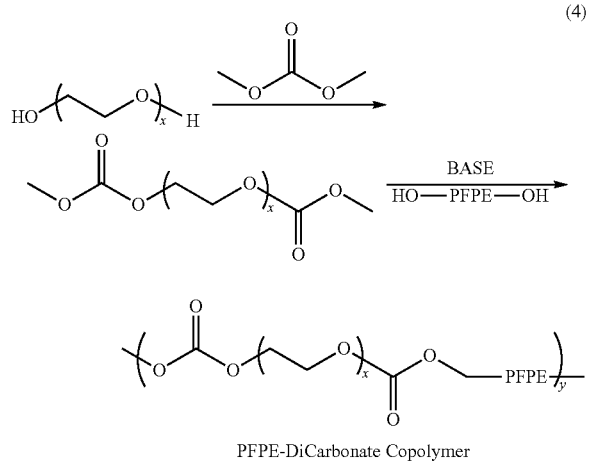

PFPE-DiCarbonate Copolymer

By controlling the molecular weight of PFPE and the molecular weight of PEO, the ratio of PFPE to conductive segments can be controlled, which in turn can be used to tune the dielectric constant of the final material. Instead of using dimethyl carbonate, phosgene (ClC(O)Cl) can be used to generate the copolymer, however; excess base is used to scavenge HCl, which is liberated during the reaction.

In other arrangements, fluorinated polymers other than PFPE can be used to form alternating copolymers with carbonate and PEO. Examples include, but are not limited to, fluoropolyethers and perfluoropolyethers, poly(perfluoroalkyl acrylate), poly(perfluoroalkyl methacrylate), polytetrafluoroethylene, polychlorotrifluoroethylene, and polyvinylidene fluoride, and combinations thereof.

The PEO may have a molecular weight between 200 and 400,000 Da or any range subsumed therein. The fluorinated polymer segments may have molecular weights between 200 and 400,000 Da or any range subsumed therein. PFPE-carbonate-PEO alternating copolymers may be solid, gels, or liquids depending on their molecular weights.

In one embodiment of the invention, alternating copolymers based on PFPE, PEO, and carbonate are combined with metal salts to form ionically-conductive electrolytes. Some useful metal salts are listed below.

Ionic liquids have been demonstrated as a class of plasticizers that increase ionic conductivity of polymer electrolytes such as PEO. It has been demonstrated that the ionic conductivity of PEO can be increased by the addition of ionic liquid, with the increase being proportional to the amount of ionic liquid added.

In one embodiment of the invention, when the alternating copolymers described above are mixed with ionic liquids they have higher ionic conductivity at low temperatures as compared to the copolymers without ionic liquid, as would be expected.

Fluoropolymers and Perfluoropolymers with Terminal Urethane Groups

In one embodiment of the invention, an electrolyte made from fluoropolymers and/or perfluoropolymers is used in a lithium battery. Examples of fluoropolymers and perfluoropolymers include but are not limited to poly(perfluoroalkyl acrylate), poly(perfluoroalkyl methacrylate), polytetrafluoroethylene, polychlorotrifluoroethylene, and polyvinylidene fluoride, and copolymers thereof.

Examples of perfluoropolyethers include but are not limited to polymers that include a segment such as a difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide segments and combinations thereof.

Perfluoropolyethers terminated with methoxycarbonyl (MC) groups have been reported as lithium ion electrolytes when formulated with lithium bis(trifluoromethane)sulfonimide. Examples of these are shown below.

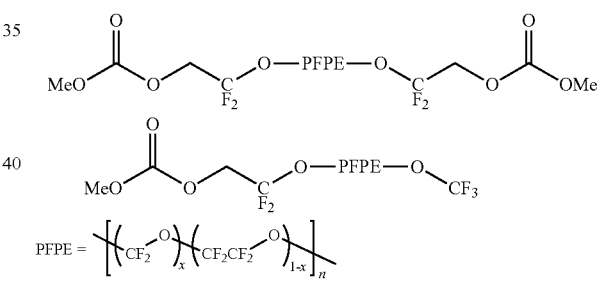

The methyl carbonate termini of these polymers enhance the solubility of lithium salt in the electrolyte when compared to the diol precursors. However, linear carbonate groups do not make an inherently good solvent for salts: as analogues, solvents such as dimethyl carbonate and diethyl carbonate have almost no ability to dissolve lithium salts. Therefore it is likely that other functional groups may provide better salt solubilities and higher ionic conductivities.

Some new materials made from perfluoropolyethers terminated with structures significantly different from the methyl carbonate group have been synthesized and have been found to provide higher ionic conductivities than comparable methyl carbonate-terminated perfluoropolyethers. This represents a new class of compounds that can be especially useful as lithium ion electrolytes.

This new class of compounds can be generalized as either of the following chemical structures. The first is terminated by a urethane at both ends. The second is terminated by a urethane group at only one end.

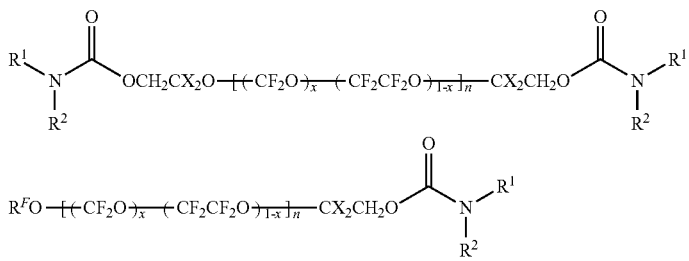

wherein x (0≤x≤1) is the mole fraction of difluoromethyleneoxy groups in the perfluoropolyether, 1-x (0≤x≤1) is the mole fraction of tetrafluoroethyleneoxy groups in the perfluoropolyether, n (1≤n≤50) is the average total number of randomly codistributed difluoromethyleneoxy and tetrafluoroethyleneoxy groups in the perfluoropolyether, and X is either H or F. $R^F$ is a perfluorinated C1-C8 straight or branched alkyl group.

In one arrangement, the $R^1$ and $R^2$ substituents are each chosen independently from short chain straight C1-C4 alkyl, branched C1-C4 alkyl, 2-methoxyethyl, 2-(2-methoxy)ethoxyethyl, or cyanoethyl. In another arrangement, $R^1$ and $R^2$ can be combined with the N in a C5-C8 heterocycloalkyl group such as pyrrolidine, piperidine, morpholine, or 4-methylpiperazine. In yet another arrangement, $R^1$ and/or $R^2$ is hydrogen.

The terminal group consisting of an oxygen-carbonyl-nitrogen link (O—C(=O)—N) is known as a carbamate or urethane group. This class of compounds may therefore be generally referred to as urethane-terminated perfluoropolyethers. The urethane group differs from the methyl carbonate group by substitution of a nitrogen. The effect of a nitrogen atom as compared to an oxygen atom is more easily appreciated in small molecules, such as in the properties of an ester and amide. Methyl acetate has a boiling point (57-58° C.), has modest miscibility with water, and is a poor solvent for salts. N,N-Dimethylacetamide has a much higher boiling point (165° C.), is completely miscible with water, and is a good organic solvent for salts. The last property in particular reflects the advantage of using urethane groups over methyl carbonate groups to terminate perfluoropolyethers for use as electrolytes: salts are more likely to be dissolved and mobile. It is also more likely for the urethane-terminated perfluoropolyethers to dissolve appreciable amounts of lithium salts other than LiTFSI, which can be useful when formulating electrolytes.

Salts that can be used in the embodiments of the invention include, but are not limited to, alkali metal salts such as lithium salts, sodium salts, potassium salts, and cesium salts. Examples of lithium salts include, but are not limited to, $LiPF_6$, $LiBF_4$, Li(BOB), $LiClO_4$, LiBETI, and LiTCB. Concentration of alkali metal salts in the electrolytes disclosed herein range from 5 to 55 wt %, 5 to 30 wt %, 10 to 20 wt %, or any range subsumed therein.

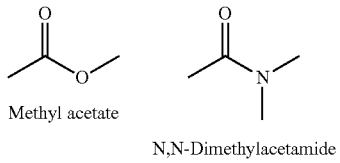

Methyl acetate  N,N-Dimethylacetamide

The linear carbonate group is not inherently strongly polar and its presence does not enhance the solubility of salts, a property crucial for electrolytes. Incorporation of other more polar groups, such as the urethane group, imparts a higher polarity and results in better salt solubility. Polarity refers to a separation of electric charge leading to a molecule or its chemical groups having an electric dipole or multipole moment. Polar molecules interact through dipole-dipole intermolecular forces and hydrogen bonds. Molecular polarity is dependent on the difference in electronegativity between atoms in a compound and the asymmetry of the compound's structure. Polarity underlies a number of physical properties including surface tension, solubility, and melting and boiling-points. Polar groups can also facilitate dissociation of lithium salts in an electrolyte; the better the dissociation of lithium salts, the higher the ionic conductivity in the electrolyte.

Urethane-terminated perfluoropolyether compounds maintain the advantages of perfluoropolyethers as electrolytes that have been previously cited, including low flammability and vapor pressure (for safety and convenience), low melting point (enabling use at low temperatures, even below 0° C.), and electrochemical inertness over a wide voltage range (appropriate for use inside an electrochemical device).

In an exemplary embodiment, synthesis of a dimethylurethane-terminated perfluoropolyether (shown in Scheme 5 below) involved the following steps: A solution of 1H,1H,8H,8H-octafluoro-3,6-dioxaoctane-1,8-diol (5.0 g) and dimethylcarbamoyl chloride (4.39 g) in diethyl ether (80 mL) was prepared in a septum-capped flask and chilled in cold water. A solution of potassium tert-butoxide (4.58 g) in tetrahydrofuran (40 mL) was added by syringe over 5 minutes. The mixture was stirred for 16 hours. Water (50 ml) was added and the organic layer was retained, washed with 40 mL of 1 M hydrochloric acid, dried over magnesium sulfate, and filtered. Evaporation of solvents and volatiles to constant weight left 6.96 g of clear oil, identified by $^1$H- and $^{19}$F-NMR methods as the desired product.

(5)

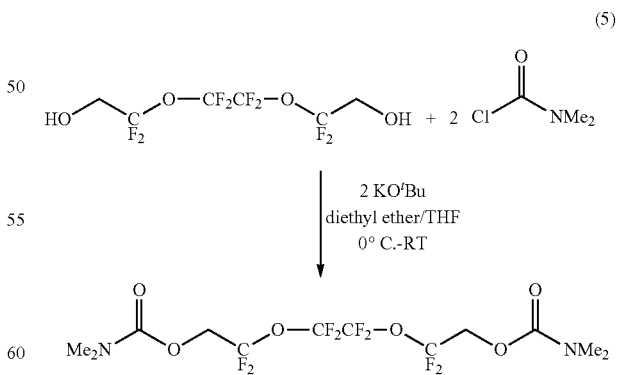

In an exemplary embodiment, synthesis of another dimethylurethane-terminated polyfluoropolyether (Scheme 5a, not shown) used a procedure similar was to that for the synthesis in Scheme 5, with 1H,1H,11H,11H-perfluoro-3,6,9-trioxaundecane-1,11-diol (5.0 g) as the starting material and adjusting the amounts of other reagents accordingly. The product was isolated as a clear oil.

In an exemplary embodiment, synthesis of a methyl carbonate-terminated polyfluoropolyether (shown in Scheme 6 below) involved the following steps: A solution of 1H,1H,8H,8H-octafluoro-3,6-dioxaoctane-1,8-diol (10.0 g), trimethylamine (8.59 g) and diethyl ether (160 mL) was prepared in a 500 mL flask and chilled in an ice-water bath for 15 minutes. A solution of methyl chloroformate (7.71 g) in diethyl ether (40 mL) was added at 2 mL/min over 20 minutes with continuous stirring and chilling of the reaction flask. The ice bath was removed and the solution was stirred for 16 hours. The reaction was then transferred to a separatory funnel and washed with 2×50 mL 1 M hydrochloric acid, 1×50 mL distilled water, and 1×50 mL saturated aqueous sodium chloride solution. The retained organic layer was dried over magnesium sulfate and filtered before solvent was removed by evaporation leaving a cloudy yellow oil. The oil was washed with 2×10 mL hexane, then re-dissolved in 30 mL of 2:1 ethyl acetate/hexane and treated with 0.5 g of decolorizing charcoal for 30 minutes. The charcoal was removed by centrifugation and filtration and the solvent removed by evaporation leaving 12 g of a clear colorless oil, identified by $^1$H and $^{19}$F-NMR methods as the desired product.

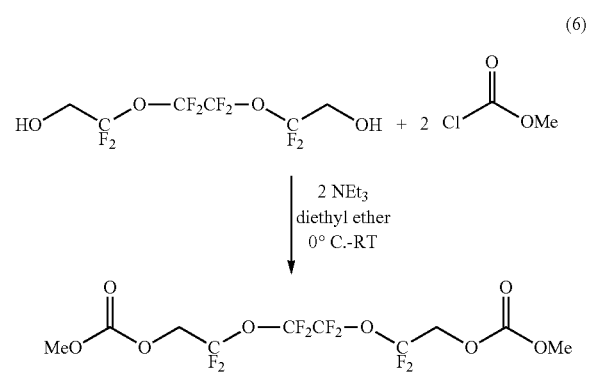

(6)

In an exemplary embodiment, synthesis of another methyl carbonate-terminated polyfluoropolyether (Scheme 6a, not shown) used a procedure similar was to that for the synthesis in Scheme 6, with 1H,1H,11H,11H-perfluoro-3,6,9-trioxaundecane-1,11-diol (10.0 g) as the starting material and adjusting the amounts of other reagents accordingly. The product was isolated as 11 g of a clear oil.

Electrolytes Made from Fluoropolymers and Perfluoropolymers with Terminal Urethane Groups Electrolyte solutions were formed by dissolving 10 wt % lithium bis(trifluoromethane) sulfonimide (LiTFSI) in the appropriate liquid. The ionic conductivities of the electrolytes were measured by constructing symmetric coin cells with porous polyolefin separators soaked through with the LiTFSI solution and performing electrochemical impedance spectroscopy. The results are shown below in Table 4. Conductivity results for methyl carbonate-terminated perfluoropolyethers are shown for comparison.

TABLE 4

Ionic conductivities of perfluoropolyether-LiTFSI electrolytes

| Electrolyte (with 10 wt % LiTFSI) | Conductivity at 40° C. (S cm$^{-1}$) | Conductivity at 80° C. (S cm$^{-1}$) |
| --- | --- | --- |
| Product of Scheme 5 | $3.6 \times 10^{-5}$ | $1.1 \times 10^{-4}$ |
| Product of Scheme 5a | $2.8 \times 10^{-5}$ | $8.8 \times 10^{-5}$ |
| Product of Scheme 6 | $9.0 \times 10^{-6}$ | $1.5 \times 10^{-5}$ |
| Product of Scheme 6a | $5.6 \times 10^{-6}$ | $1.5 \times 10^{-5}$ |

Thus, urethane-terminated electrolytes (from Schemes 5 and 5a) have ionic conductivities 4 to 10 times greater than those of the methyl carbonate-terminated electrolytes (from Schemes 6 and 6a) under similar conditions.

Fluoropolymers and Perfluoropolymers with Terminal Cyclic Carbonate Groups

Some additional new materials made from perfluoropolyethers terminated with structures significantly different from the methyl carbonate group have been synthesized and have been found to provide higher ionic conductivities than comparable methyl carbonate-terminated perfluoropolyethers. This represents a new class of compounds that can be especially useful as lithium ion electrolytes.

This new class of compounds can be generalized as either of the following chemical structures, according to an embodiment of the invention. The first is terminated by a cyclic carbonate group at both ends. The second is terminated by a cyclic carbonate group at one end.

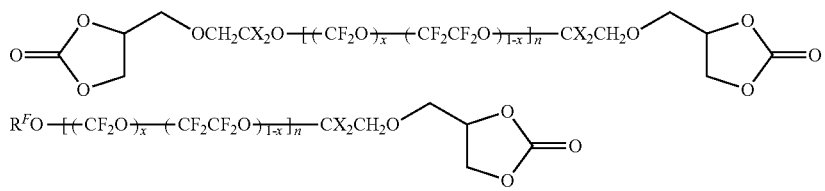

wherein x (0≤x≤1) is the mole fraction of difluoromethyleneoxy groups in the perfluoropolyether, 1-x (0≤x≤1) is the mole fraction of tetrafluoroethyleneoxy groups in the perfluoropolyether, n (1≤n≤50) is the average total number of randomly codistributed difluoromethyleneoxy and tetrafluoroethyleneoxy groups in the perfluoropolyether, and X is either H or F. $R^F$ is a perfluorinated C1-C8 straight or branched alkyl group.

In one embodiment of the invention, such structures incorporate 6-membered cyclic carbonate rings:

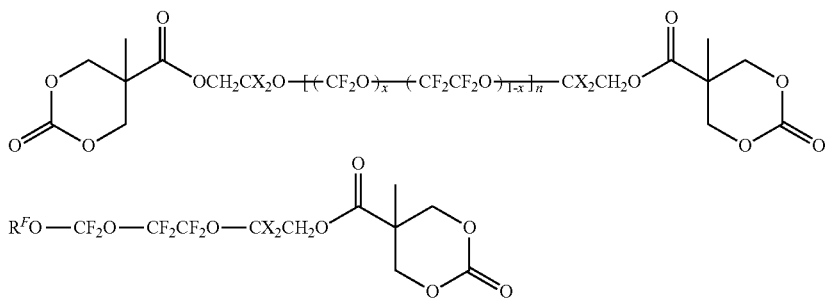

wherein x (0≤x≤1) is the mole fraction of difluoromethyleneoxy groups in the perfluoropolyether, 1-x (0≤x≤1) is the mole fraction of tetrafluoroethyleneoxy groups in the perfluoropolyether, n (1≤n≤50) is the average total number of randomly codistributed difluoromethyleneoxy and tetrafluoroethyleneoxy groups in the perfluoropolyether, and X is either H or F. $R^F$ is a perfluorinated C1-C8 straight or branched alkyl group.

The linear carbonate group is not inherently strongly polar and its presence does not enhance the solubility of salts, a property crucial for electrolytes. Incorporation of other more polar groups, such as cyclic carbonate groups, imparts a higher polarity and results in better salt solubility. Polarity refers to a separation of electric charge leading to a molecule or its chemical groups having an electric dipole or multipole moment. Polar molecules interact through dipole-dipole intermolecular forces and hydrogen bonds. Molecular polarity is dependent on the difference in electronegativity between atoms in a compound and the asymmetry of the compound's structure. Polarity underlies a number of physical properties including surface tension, solubility, and melting and boiling-points. Polar groups can also facilitate dissociation of lithium salts in an electrolyte; the better the dissociation of lithium salts, the higher the ionic conductivity in the electrolyte.

The terminal cyclic carbonate groups are similar to those of the small molecule ethylene carbonates. Constraint of the carbonate group in a cyclic ring has a dramatic effect on its properties, as can be seen when comparing the physical properties of small molecule cyclic carbonates as compared to acyclic carbonates:

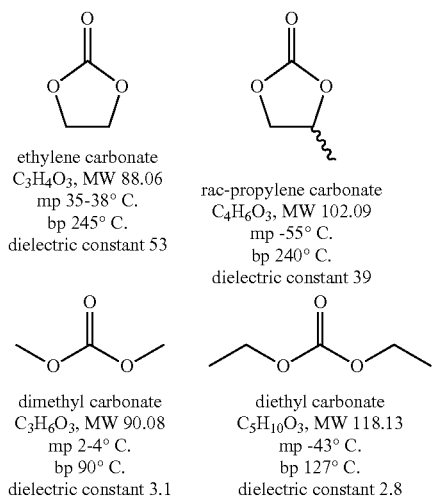

ethylene carbonate
$C_3H_4O_3$, MW 88.06
mp 35-38° C.
bp 245° C.
dielectric constant 53 rac-propylene carbonate
$C_4H_6O_3$, MW 102.09
mp -55° C.
bp 240° C.
dielectric constant 39 dimethyl carbonate
$C_3H_6O_3$, MW 90.08
mp 2-4° C.
bp 90° C.
dielectric constant 3.1 diethyl carbonate
$C_5H_{10}O_3$, MW 118.13
mp -43° C.
bp 127° C.
dielectric constant 2.8

The much higher boiling points and dielectric constants for the cyclic carbonates demonstrate that cyclization causes physical properties to change significantly. The properties of the cyclic carbonate-terminated perfluoropolyethers may then be expected to differ measurably from those of linear carbonate-terminated perfluoropolyethers, especially those properties pertaining to the solubility and transport of dissolved lithium salts.

Appending 5-membered cyclic carbonate termini onto perfluoropolyether precursors involves a particularly different methodology from that reported for the synthesis of linear carbonate-terminated perfluoropolyethers. In one arrangement, the method involves a two-step procedure of first reacting the alcoholic endgroups with epichlorohydrin to form an oxirane intermediate, followed by a halide-catalyzed reaction with carbon dioxide to form the 5-membered cyclic carbonate (see Examples). The suggested 6-membered cyclic carbonate termini are incorporated via an ester linkage, which is distinct from the carbonate functional group.

The cyclic carbonate-terminated perfluoropolyether compounds maintain the advantages of using perfluoropolyethers as electrolytes that have been previously cited, including: low flammability and vapor pressure (for safety and convenience), low melting point (enabling use at low temperatures, even below 0° C.), and electrochemical inertness over a wide voltage range (appropriate for use inside an electrochemical device). But the carbonate-terminated perfluoropolyether compounds reported herein have the added advantages of increased solubility and enhanced transport of dissolved lithium salts.

In an exemplary embodiment, synthesis of a cyclic carbonate-terminated polyfluoropolyther (shown in Scheme 7 below) involves the following steps: A solution of 1H,1H-nonafluoro-3,6-dioxaheptan-1-ol (28.2 g), epichlorohydrin (18.5 g) and tetrahydrofuran (30 mL)

In an exemplary embodiment, synthesis of a cyclic carbonate-terminated polyfluoropolyther (shown in Scheme 7 below) involves the following steps: A solution of 1H,1H-nonafluoro-3,6-dioxaheptan-1-ol (28.2 g), epichlorohydrin (18.5 g) and tetrahydrofuran (30 mL) was prepared in a 250 mL flask. At 20 minute intervals, four (4) portions of 1.5 g powdered sodium hydroxide (6.0 g total) were added, with vigorous stirring. The mixture was then heated to reflux for 5 hours. It was then cooled and filtered before removal of solvent on a rotary evaporator. The residue was vacuum distilled to isolate 17 g of the intermediate oxirane (boiling point ~65° C. at 1 torr). 10 g of the intermediate oxirane were charged to a 40 mL vial and purged with dry $CO_2$ gas (50 mL/min) for 15 minutes. Tetrabutylammonium bromide (100 mg) was added, then the mixture was heated with continued $CO_2$ bubbling in a 125° C. oilbath for 16 h. The solution was then cooled and washed with hexane (2×10 mL) before vacuum drying to constant weight, leaving 10 g of clear oil, identified by $^1$H and $^{19}$F-NMR methods as the desired product containing <1 wt % of residual tetrabutylammonium bromide.

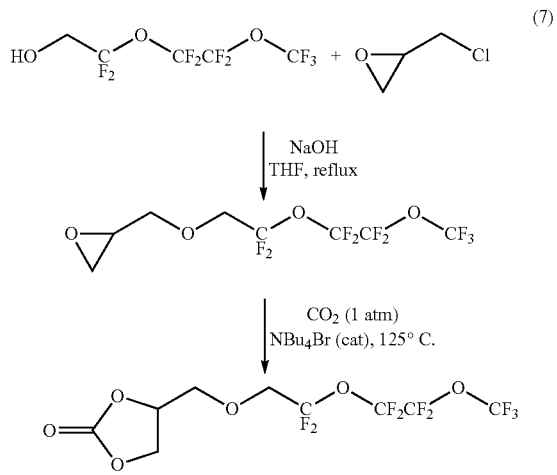

(7)

In an exemplary embodiment, synthesis of another cyclic carbonate-terminated polyfluoropolyther (Scheme 7a, not shown) used a procedure similar was to that for the synthesis in Scheme 7, with 1H,1H-tridecafluoro-3,6,9-trioxadecan-1-ol as the starting material. The product was isolated as a clear oil.

In an exemplary embodiment, synthesis of another cyclic carbonate-terminated polyfluoropolyther (Scheme 7b, not shown) used a procedure similar was to that for the synthesis in Scheme 8, with 1H,1H,11H,11H-perfluoro-3,6,9-trioxaundecane-1,11-diol (10.0 g) as the starting material and adjusting the amounts of other reagents accordingly. The product was isolated as 11 g of a clear oil.

Electrolytes Made from Fluoropolymers and Perfluoropolymers with Terminal Cyclic Carbonate Groups Electrolyte solutions were formed by dissolving 10 wt % lithium bis(trifluoromethane)sulfonimide (LiTFSI) in the appropriate liquid. The ionic conductivities of the electrolytes were measured by constructing symmetric coin cells with porous polyolefin separators soaked through with the LiTFSI solution and performing electronic impedance spectroscopy. The results are shown below in Table 4. Conductivity results for methyl carbonate-terminated perfluoropolyethers Scheme 6 and Scheme 6a are shown for comparison.

TABLE 4

Ionic conductivities of cyclic carbonate terminated perfluoropolyether-LiTFSI electrolytes

| Electrolyte (with 10 wt % LiTFSI) | Conductivity at 80° C. (S cm$^{-1}$) |
|---|---|
| Product of Scheme 6 | 1.5 × 10$^{-5}$ |
| Product of Scheme 6a | 1.5 × 10$^{-5}$ |
| Product of Scheme 7 | 1.6 × 10$^{-4}$ |
| Product of Scheme 7a | 8.8 × 10$^{-5}$ |

Thus, the cyclic carbonate-terminated electrolytes (Schemes 7 and 7a) have ionic conductivities 6 to 10 times greater than those of the methoxycarbonyl-terminated electrolytes (Schemes 6 and 6a) under similar conditions.

PEO-Graft-Copolymers

In one embodiment of the invention, PEO has been modified to reduce its melting temperature, thus also suppressing its crystallization temperature, by grafting it with perfluoro functional groups. When such a PEO grafted with perfluoro functional groups is combined with an electrolyte salt, it can be used as an electrolyte with good ionic conductivity at lower temperatures than had been possible for PEO alone. It has been found that addition of an ionic liquid to such an electrolyte can increase the ionic conductivity even more than would be expected.

As the proportion of perfluoro functional groups increases, both the ionic conductivity and the $T_m$ of the PEO graft-copolymer electrolyte decreases. At the same time, the decreased $T_m$ makes it possible to use the PEO copolymer as an electrolyte at lower temperatures without its crystallization and concomitant reduction in ionic conductivity. Through careful experimentation, an optimal proportion of perfluoro functional groups to include in a PEO graft-copolymer may be determined for a particular application.

In one embodiment, a PEO based polymer contains randomly distributed, grafted fluorinated groups. The fluorinated groups may be one or more of perfluoro alkanes (PFA), fluoropolyethers and perfluoropolyethers (PFPE), poly(perfluoroalkyl acrylate), poly(perfluoroalkyl methacrylate), polytetrafluoroethylene, polychlorotrifluoroethylene, and polyvinylidene fluoride, and combinations thereof. The perfluoropolyether may include a segment such as difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide groups, or combinations thereof.

In one arrangement, the perfluoro functional groups make up between 1 mol % and 30 mol % of the PEO graft copolymer. In another arrangement, the perfluoro functional groups make up between 1 mol % and 20 mol % of the PEO graft copolymer. In yet another arrangement, the perfluoro functional groups make up between 2 mol % and 5 mol % of the PEO graft copolymer.

In one arrangement, the perfluoro functional groups have a molecular weight ranging from 200 to 500 Da. In another arrangement, the perfluoro functional groups have a molecular weight ranging from 500 to 10,000 Da. In yet another arrangement, the perfluoro functional groups have a molecular weight ranging from 10,000 to 100,000 Da. In yet another arrangement, the perfluoro functional groups have a molecular weight ranging from 200 to 100,000 Da, or any range subsumed therein. In yet another arrangement, the perfluoro functional groups have a molecular weight ranging from 200 to 10,000 Da.

PEO-Graft-PFPE Copolymers

In one embodiment of the invention, grafting of PFPE onto PEO was accomplished by nucleophilic substitution of PFPE-based alkoxide on chloromethyl groups in P(EO-r-EPCH) as shown below in (8). The amount of PFPE was controlled by changing either the grafting density or the molecular weight of the PFPE reactant.

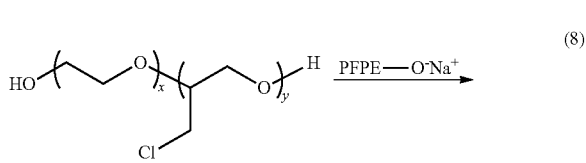

(8)

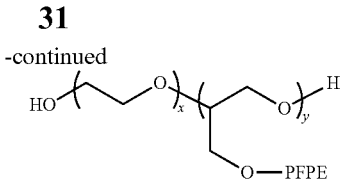

wherein x and y represent the relative mole fractions of the two types of monomers in the copolymer and can have values from 0 to 100%.

In one arrangement, the pure PEO component makes up between about 20 and 99 mol %, or any range subsumed therein, of the product polymer shown in (8) above. In another arrangement, the PEO component makes up between about 50 and 90 mol %, or any range subsumed therein, of the product polymer shown in (8) above. In another arrangement, the PEO component makes up between about 90 and 97 mol %, or any range subsumed therein, of the product polymer shown in (8) above.

In one arrangement, the molecular weight of starting P(EO-r-EPCH) polymer ranges between 10 and 50 KDa, or any range subsumed therein. In another arrangement, the molecular weight of starting P(EO-r-EPCH) polymer ranges between 20 and 200 KDa, or any range subsumed therein. In another arrangement, the molecular weight of starting P(EO-r-EPCH) polymer ranges between 200 and 8000 KDa, or any range subsumed therein. In one arrangement, the molecular weight of PFPE ranges between 0.2 and 15 KDa, or any range subsumed therein. In another arrangement, the molecular weight of PFPE ranges between 100 and 500 KDa, or any range subsumed therein.

Other fluorinated grafting groups are also possible in the general structure shown in (1). Cyclic perfloro alkanes such as perfluoro(methylcyclohexane) and perfluoro(methylcyclopentane) and aromatic versions such as pentafluorophenoxide and 2,3,5,6-tetrafluorophenol may be grafted onto the PEO based polymer.

In one embodiment of the invention, PEO-graft-PFPE copolymers are combined with metal salts to form ionically-conductive electrolytes. Some useful metal salts are listed below.

PEO-Graft-PFA Copolymers

In various embodiments of the invention, grafting of PFA onto PEO was accomplished using one of two different synthetic approaches, which are shown below. The amount of PFA can be controlled by changing either the grafting density or the molecular weight of the PFA reactant.

The first approach, shown as (9) below, involves nucleophilic substitution of perfluro alkoxide, which is generated from hydroxyl PFA using a base such as sodium hydride (NaH) or sodium hydroxide (NaOH). The perfluro alkoxide is reacted with pendant chloromethyl groups in P(EO-r-EPCH) to form the grafted copolymer.

In a second approach, a thiol-ene reaction between pefluoro alkane thiol and poly(EO-r-AGE) in the presence of a photoinitiator and under UV irradiation can be used to produce the graft copolymer in high yields, as shown in (10) below. The polymer product in (10) may be synthesized with various amounts of the pendant PFA units ranging from 1 to 30 mol %, or any range subsumed therein.

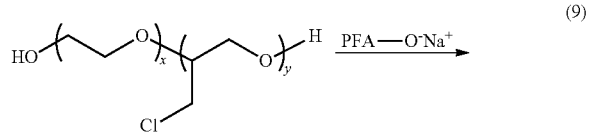

(9)

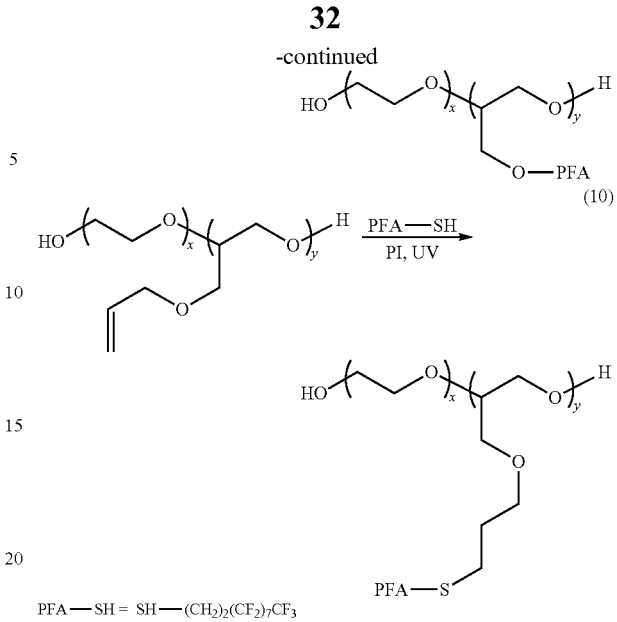

wherein x and y represent the relative mole fractions of the two types of monomers in the copolymer and can have values from 0 to 100%.

In one arrangement, the pure PEO component makes up between about 20 and 99 mol %, or any range subsumed therein, of the product polymer shown in (8) above. In another arrangement, the PEO component makes up between about 50 and 90 mol %, or any range subsumed therein, of the product polymer shown in (9) or (10) above. In another arrangement, the PEO component makes up between about 90 and 97 mol %, or any range subsumed therein, of the product polymer shown in (9) or (10) above.

In one arrangement, the molecular weight of starting P(EO-r-EPCH) polymer ranges between 10 and 50 KDa, or any range subsumed therein. In another arrangement, the molecular weight of starting P(EO-r-EPCH) polymer ranges between 20 and 200 KDa, or any range subsumed therein. In another arrangement, the molecular weight of starting P(EO-r-EPCH) polymer ranges between 200 and 8000 KDa, or any range subsumed therein. In one arrangement, the molecular weight of PFPE ranges between 0.2 and 15 KDa, or any range subsumed therein. In another arrangement, the molecular weight of PFPE ranges between 100 and 500 KDa, or any range subsumed therein.

Other fluorinated grafting groups are also possible in the general structure shown in (9) or (10). Cyclic perfloro alkanes such as perfluoro(methylcyclohexane) and perfluoro (methylcyclopentane) and aromatic versions such as pentafluorophenoxide and 2,3,5,6-tetrafluorophenol may be grafted onto the PEO based polymer.

In one embodiment of the invention, PEO-graft-PFA copolymers are combined with metal salts to form ionically-conductive electrolytes. Some useful metal salts are listed below.

Figure 8:
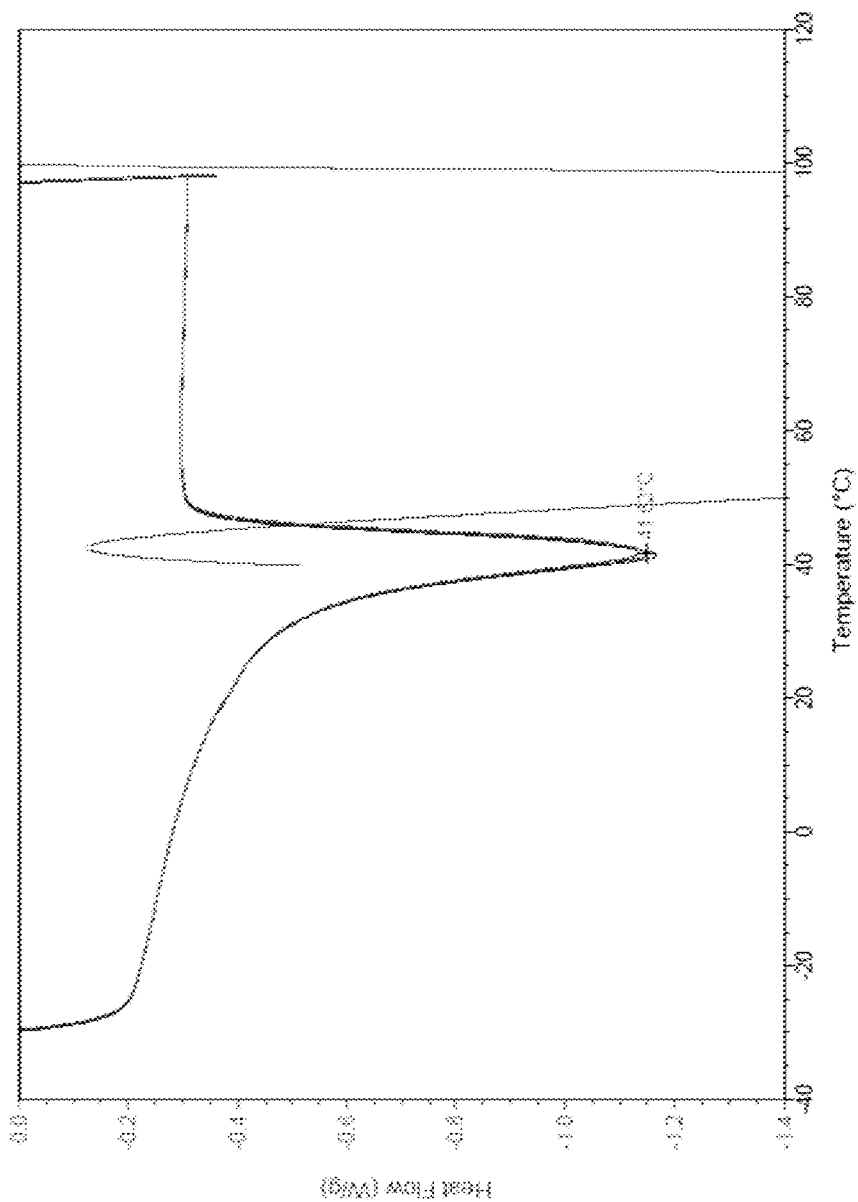
FIG. 8 is a differential scanning calorimetry (DSC) trace of the compound shown as (11) below with a 2.3 mol % pefluro alkane (PFA) repeat unit.

In an exemplary embodiment, the graft polymer product in (10) was synthesized with various amounts, ranging from 1 to 30 mol %, of pendant PFA units. The graft polymer product (10) materials were characterized using $^1$H NMR and GPC. A representative DSC trace of graft polymer product (10) with 2.3 mol % PFA repeat units is shown in FIG. 8. The $T_m$ of this graft copolymer is 41° C. as compared with 60° C. for PEO, suggesting a strong influence from the PFA grafted side chains in the crystallization temperature of the PEO-based copolymer.

In both of the approaches described in (9) and (10) above, the number of grafted PFA units can be varied by changing the amount of reactive functional groups in the starting PEO copolymer, either the —CH$_2$Cl in P(EO-r-ECH) or the allyl groups in P(EO-r-AGE). The number of PFA units can be chosen to tune the $T_m$ and the resulting ionic conductivity of the final material.

PEO Graft-Copolymer Additives

Plasticizing additives may be combined with the polymer electrolytes to increase the ionic conductivity of the electrolytes. Essentially, any small molecule can function in this role, but it is desirable to use additives that do not react at the electrodes over the voltage range and operating temperature range of the battery cells. When the electrolytes are used without additives, the system is a dry solid polymer electrolyte. When additives are used, the system is a gel electrolyte. Non-volatile plasticizers are preferred when high temperature operation is desired. Such non-volatile plasticizers may increase ionic conductivity so much that cell operating temperatures can be decreased. The increased ionic conductivity from the non-volatile plasticizer(s) may compensate for the decreased inherent ionic conductivity from the lower temperatures. But such non-volatile plasticizers may also be used stably at high temperatures due to their non-volatility, even to temperatures as high as 100° C. or higher. Dry electrolyte systems can also be used at high temperatures (100° C. or higher) due to their inherent non-volatility.

Ionic liquids are a class of non-volatile plasticizers that have been demonstrated to increase ionic conductivity of polymer electrolytes such as PEO. The ionic conductivity of PEO can be increased by the addition of ionic liquid, with the increase being proportional to the amount of ionic liquid added.

In one embodiment of the invention, when PEO-graft-PFA copolymer electrolytes are mixed with ionic liquids, they have higher ionic conductivities at low temperatures than the same copolymer electrolytes without ionic liquid, as would be expected. In an unforeseen discovery, the increase in the ionic conductivity of the mixture of the PEO-graft-PFA electrolyte and ionic liquids is greater than the increase in the ionic conductivity of the mixture of PEO homopolymer electrolyte with the same proportion of ionic liquid. Without wishing to be bound to any particular theory, it may be that the PEO-graft-PFA electrolyte has a higher affinity for the ionic liquid than does the pure PEO electrolyte. A higher affinity may result in better mixing including increased miscibility of the polymer with both the ionic liquid and the metal salts.

Figure 9:
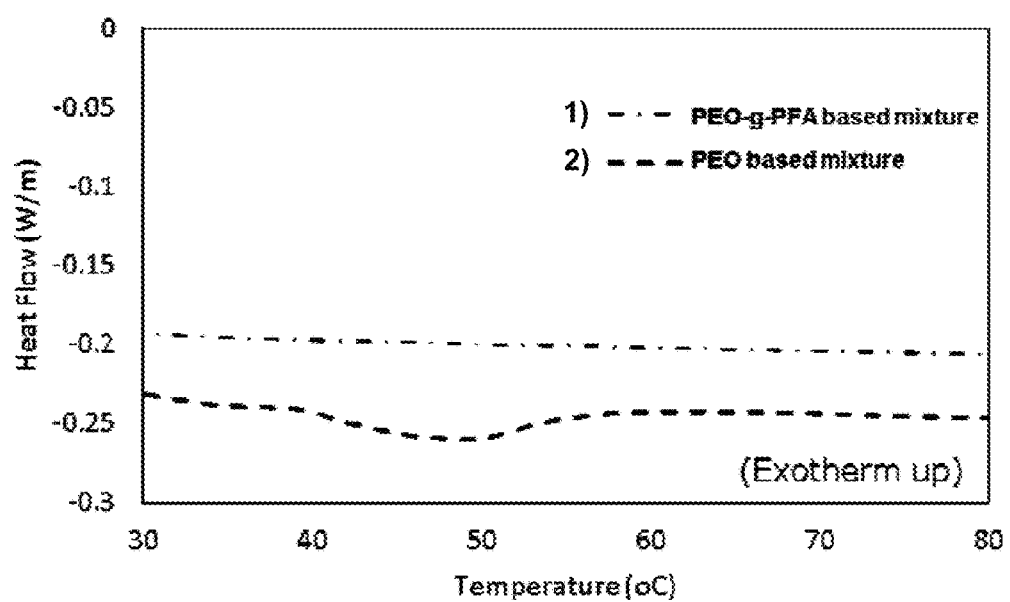
FIG. 9 shows DSC traces for 1) a PEO-graft-PFA copolymer with a 2.3 mol % PFA repeat unit mixed with LiTFSI and an ionic liquid and 2) a PEO homopolymer mixed with the same amounts of LiTFSI and the ionic liquid.

In an exemplary embodiment, graft polymer product (10) (with 2.3 mol % PFA repeat units) was mixed with a lithium salt (LiTFSI) and 30 wt % ionic liquid (1-methyl-3-propylimidazolium bis(trifluoromethylsulfonyl)imide). FIG. 9 shows a DSC trace for this electrolyte mixture (shown as 1) and for a mixture of PEO homopolymer with the same salt and ionic liquid in the same proportions (shown as 2). The crystalline melting peak from the PEO mixture sample at about 48° C. is evident, and there is no such peak for the graft polymer product (10) mixture, indicating that crystallization has been completely suppressed below the testing temperature window in the mixture with graft polymer product (10).

Figure 10:
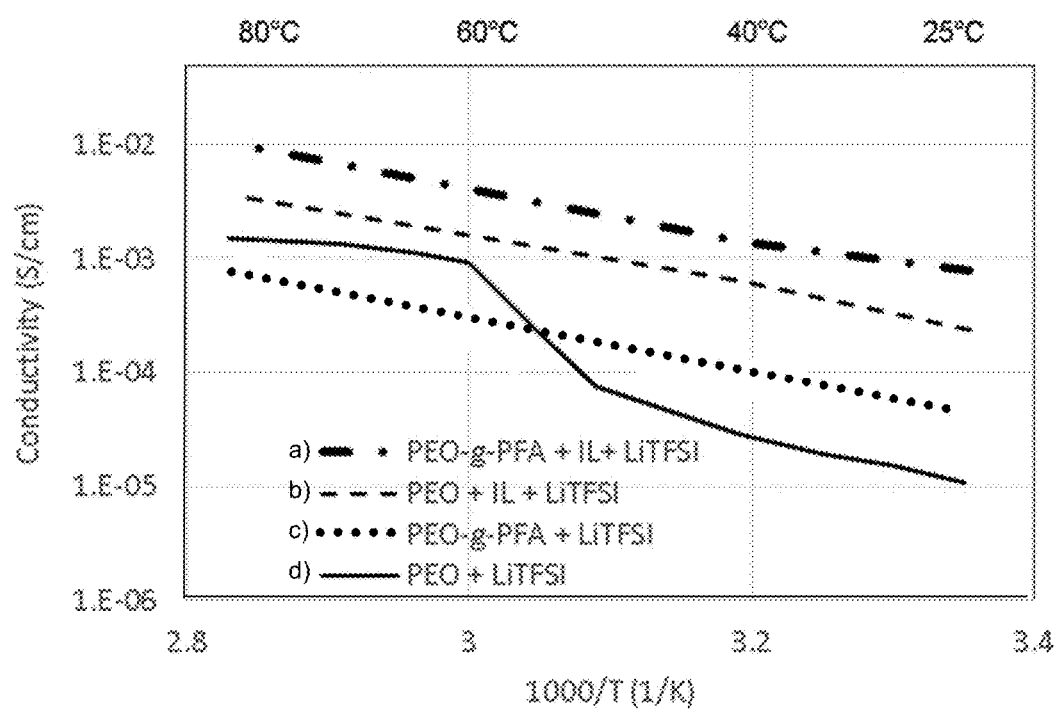
FIG. 10 shows graphs of ionic conductivity as a function of inverse temperature for cells made with various electrolyte mixtures, according to an embodiment of the invention.

FIG. 10 shows graphs of ionic conductivity as a function of inverse temperature for cells made with various electrolyte mixtures, according to an embodiment of the invention. The following four electrolyte mixtures were used:
a) graft polymer product (10) (2.3 mol % PFA), 30 wt. % ionic liquid (1-methyl-3-propylimidazolium bis(trifluoromethylsulfonyl)imide) (MPITFSI), and LiTFSi (r=0.1 equivalent with respect to EO);
b) PEO, 30 wt. % ionic liquid (1-methyl-3-propylimidazolium bis(trifluoromethylsulfonyl)imide) (MPITFSI), and LiTFSi (r=0.1 equivalent with respect to EO);
c) graft polymer product (10) (2.3 mol % PFA) and LiTFSi (r=0.1 equivalent with respect to EO);
d) PEO and LiTFSi (r=0.1 equivalent with respect to EO).

Curve (d) shows the well-known ionic conductivity behavior of PEO electrolyte. At temperatures above $T_m$, ionic conductivity is on the order of $10^{-3}$ S/cm. Once PEO begins to crystallize around 60° C., the conductivity drops sharply and continues to drop to $10^{-5}$ around 25° C. Curve (c) in which the PEO graft-copolymer is used shows conductivity slightly less that of PEO alone (curve d) at 80° C. and decreases gradually throughout the temperature range shown but maintains a higher conductivity than PEO (curve d) at temperatures below the $T_m$ of PEO.

Curve (b) shows that PEO electrolyte combined with an ionic liquid has conductivity slightly more that of PEO alone (curve d) at 80° C. and decreases gradually throughout the temperature range shown. The really surprising result is shown by curve (a) for the PEO graft-copolymer combined with an ionic liquid. Ionic conductivity is about $10^{-2}$ S/cm at 80° C. and does not drop to $10^{-3}$ S/cm until temperatures around 35° C. This is a significant improvement in ionic conductivity for a PEO-based electrolyte and occurs over a wide range of temperatures.

Optimizing Energy Density and Specific Energy

To achieve high specific energy in lithium (or other alkali metal) batteries, the proportion of active components (anode and cathode) is maximized and optimally balanced, while the proportion of the auxiliary components (separator, electrolyte and current collectors) that cannot store energy is minimized. An optimized anode may be a thin foil of lithium metal, as discussed above, which serves as both the anode and the current collector, and requires no additional ionic conduction within the foil as the lithium ions exchange at its surface with lithium metal. A lithium foil thick enough to be physically strong and manufacturable typically provides a large excess of lithium compared to the capacity of the cathode. Thus, taking full advantage of the capacity of the overly thick anode foil would require thicker, higher-capacity cathodes as well. However, the actual thickness of the cathode is limited in practice by the depth to which both electrons and lithium ions can reach. Unlike with the lithium foil planar anode, ions and electrons in the cathode must traverse the entire thickness of the cathode. Very thick cathodes may contain regions of active material to which lithium ions cannot diffuse on relevant time scales dictated by the cell cycling rate, rendering such regions dead weight and reducing useable specific capacity of the cathode and therefore specific energy and energy density of the cell.

One approach to overcome these difficulties is to increase the ionic conductivity in the PE electrolyte of the cathode by using a liquid electrolyte. Liquid electrolytes based on mixtures of organic carbonate solvents with lithium salts and traces of performance enhancers are the industry standard in commodity-type lithium ion batteries. But the long-term stability of such batteries is limited, with shelf lifetimes of two years or less; the lifetimes are further shortened if the batteries are cycled aggressively.

As discussed above, block copolymer electrolytes can act as effective, durable separators between the anode and cathode, providing sufficient ionic conductivity for rapid charging and discharging while maintaining a physically robust barrier to prevent growth of dendrites from the anode or other detrimental breakdown. Such block copolymer electrolytes can also act as a separator between a PE electrolyte and the anode, eliminating detrimental interactions. In order to prevent any PE electrolyte from absorbing into the block copolymer electrolyte and traveling to the anode, it would be useful if the PE electrolyte and the block copolymer electrolyte were immiscible.

Another problem in electrochemical cells such as batteries is polarization (low transference number) of ionic and electronic species, which can result in suboptimal capacity even at low charge/discharge rates or high IR losses at high charge/discharge rates. A high lithium transference number (near 1, on a scale of 0 to 1) indicates that movement of lithium ions is predominantly responsible for the observed ionic conductivity, with little contribution from the counter-ion. In the context of battery operation, a high lithium transference number indicates that very little polarization occurs, as the counter-ions do not move and accumulate into concentration gradients.

Through careful choice of liquid PE electrolytes in the cathode and immiscible block copolymer separator electrolytes, high ionic conductivity in the cathode, little or no polarization (lithium transference number near 1) can be achieved resulting in high specific energy lithium (or other alkali metal) battery cells.

The block copolymer electrolytes discussed above have separated microphases of ion-conducting segments and non-conducting, structural segments often possessing polar and non-polar natures, respectively. With both polar and non-polar components, many organic solvents would be likely to swell one or both of the phases, either of which would lead to structural weakening. For example, some organic carbonate electrolyte formulations are compatible with cathode active materials and could be candidates for PE electrolytes. However, such formulations tend to be absorbed by portions of block copolymer electrolytes, leading to plasticization (softening), weakening, reaction with the lithium anode, and failure.

As an alternative, heavily fluorinated molecules are known to be immiscible with both polar and non-polar organic phases, and would not cause swelling in the block copolymer electrolyte disclosed herein. It has been reported that lithium electrolytes based on fluorinated polyethers have very high lithium transference numbers when formulated with a lithium salt (e.g., LiTFSI). See, for example, Wong et al, "Nonflammable perfluoropolyether-based electrolytes for lithium batteries," PNAS Mar. 5, 2014 vol. 111 no. 4 3327-3331. Such a fluorinated liquid electrolyte, and derivations thereof, are excellent catholytes for pairing with a block copolymer separator; the catholyte has sufficient ionic conductivity, causes no polarization and does not swell or weaken the separator. Fluorinated liquids of sufficient molecular weight can also be reliably non-volatile and non-flammable.

In one embodiment of the invention, fluorinated liquid electrolytes in the cathode contain one or more of perfluoropolyethers, mono- or diol-terminated perfluoropolyethers, alkylcarbonate-terminated perfluoropolyethers, poly(perfluoropolyether)acrylates or poly(perfluoropolyether)methacrylates, or poly(perfluoropolyether)glycidyl ethers. In one arrangement, the molecular weights of the fluorinated liquids range from 200 Da to 10,000 Da. In one arrangement, the liquids based on polymerized perfluoropolyether-acrylates, -methacrylates, and -glycidyl ethers are polymerized or copolymerized with each other or with small amounts (<10 wt/o) of other acrylates, methacrylates, or glycidyl ether monomers. Such copolymerization can change material properties, such as surface tension, viscosity, and adhesion. Polymers formed from these fluorinated monomers would also be immiscible with the block copolymers mentioned above.

Fluorinated liquids can have very low surface tensions, which would lead to leaching and spreading of the liquid out of the cathode if the cathode is not properly sealed. In some arrangements, the fluorinated liquid electrolyte in the cathode is gelled. The fluorinated liquid is absorbed into a polymer matrix to form such a polymer gel electrolyte. The polymer matrix may also be fluorinated to ensure compatibility with the fluorinated liquid. Possible examples include high molecular weight (>10,000 Dalton) perfluoropolyethers, poly(perfluoropolyether)acrylates, poly(perfluoropolyether)methacrylates, or poly(perfluoropolyether)glycidyl ethers, as well as copolymers and block copolymers of these with non-fluorinated polymers.

In one arrangement, the fluorinated liquid electrolyte is crosslinked. Depending on whether the mechanism of ionic conduction is or is not dependent on long range motion of the electrolyte molecules, crosslinking may have very little effect on the overall ionic conductivity of the electrolyte. Crosslinking past a certain threshold may cause the liquid electrolyte to become an immobile gel. Multifunctional or telechelic variants of the fluorinated polymers listed above are examples of crosslinkable electrolytes.

Certain organic molecule additives may be added to the fluorinated electrolyte to improve electrochemical stability of the cathode active material. Such molecules may be added in small enough amounts that they would not adversely affect other parts of the cell if they were to diffuse out of the cathode. Compound classes commonly used as additives include cyclic organic carbonates, cyclic acetals, organic phosphates, cyclic organic sulfates, and cyclic organic sulfonates.

The ionic conductance of each component of an electrochemical cell can be determined. In general, conductance, G is given by:

$$G = \frac{\sigma A}{l}, \quad \text{(Equation 1)}$$

where σ is ionic conductivity, A is cross-sectional area, and l is length. Two conductances in series, $G_1$, $G_2$ have a total conductance $G_{tot}$ given by:

$$G_{tot} = \frac{G_1 G_2}{G_1 + G_2} \quad \text{(Equation 2)}$$

When the electrode assembly has a composite configuration, the ionic conductance can be calculated easily from Equation (1). When the electrode assembly has a multiple layer configuration, the conductance of each layer is found, and the total conductance is given by Equation (2). In one embodiment of the invention, the conductance of the negative electrode assembly and the conductance of the positive electrode assembly have a difference of no more than 25%. In another embodiment of the invention, the conductance of the NE electrode assembly, the conductance of the PE electrode assembly, and the conductance of the separator electrolyte are all within 25% of one another. Matching conductance in this way can result in a cell with an optimized, minimal impedance profile.

Several useful fluorinated liquids may be used as PE electrolytes in the embodiments of the invention. The following examples are meant to be illustrative and not restrictive.

In one exemplary embodiment, a perfluoropolyether is terminated with trifluoromethoxy groups. Note that m, 1−m=mole fractions of repeat units ($0<=m<=1$), n=number of repeat units ($2<=n<=100$). This structure is used to define the $R_F$ abbreviated structure referenced in the subsequent structures.

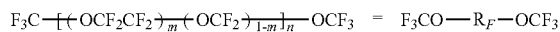

In another exemplary embodiment, mono- and diol-terminated perfluoropolyethers can be used as PE electrolytes:

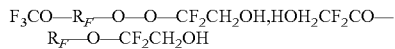

In another exemplary embodiment, alkylcarbonate-terminated perfluoropolyether; R=C1-C8 alkyl, C1-C8 branched alkyl, or C5-C8 cyclic alkyl can be used as PE electrolytes:

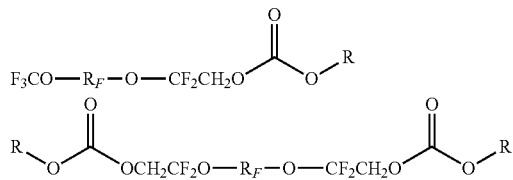

In other exemplary embodiments, poly(perfluoropolyether)acrylate (R'=H) or poly(perfluoropolyether)methacrylate (R'=Me); k=number of repeat units ($5<=k<=50$) can be used as PE electrolytes:

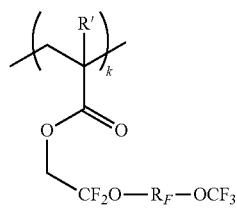

In another exemplary embodiment, poly(perfluoropolyether)glycidyl ether; k=number of repeat units ($5<=k<=50$) can be used as PE electrolytes:

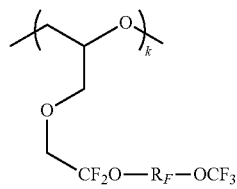

Figure 11:
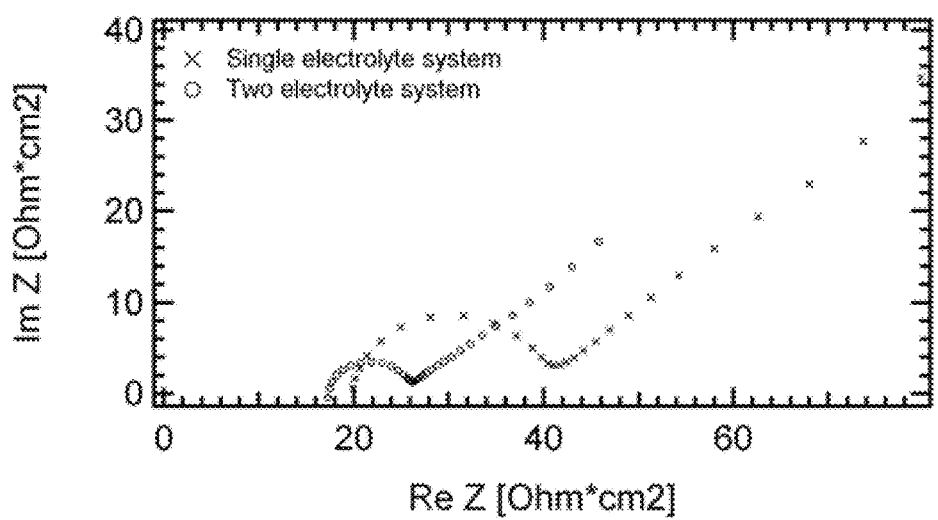
FIG. 11 shows a complex impedance plot for a single electrolyte system (x) and for a two electrolyte system (o).

FIG. 11 shows a complex impedance plot for a single electrolyte system (x) and for a two electrolyte system (o).

The single electrolyte cell contains only a (first) dry polymer electrolyte optimized for stability against the lithium metal anode film. The two electrolyte cell has the same first dry polymer electrolyte and a second dry polymer electrolyte optimized for low interfacial impedance against the composite cathode. As is well known to a person having ordinary skill in the art, the size of the kinetic arc in the plot reflects the total resistance of the system. One might anticipate that adding an additional interface (first polymer electrolyte/second polymer electrolyte interface) could add additional resistance to the system. But, surprisingly, the two electrolyte system has lower total resistance, as indicated by the smaller kinetic arc (o), than does the single electrolyte system. There is a clear advantage in using multiple electrolytes optimized for their functions in the cell.

Figure 12A:
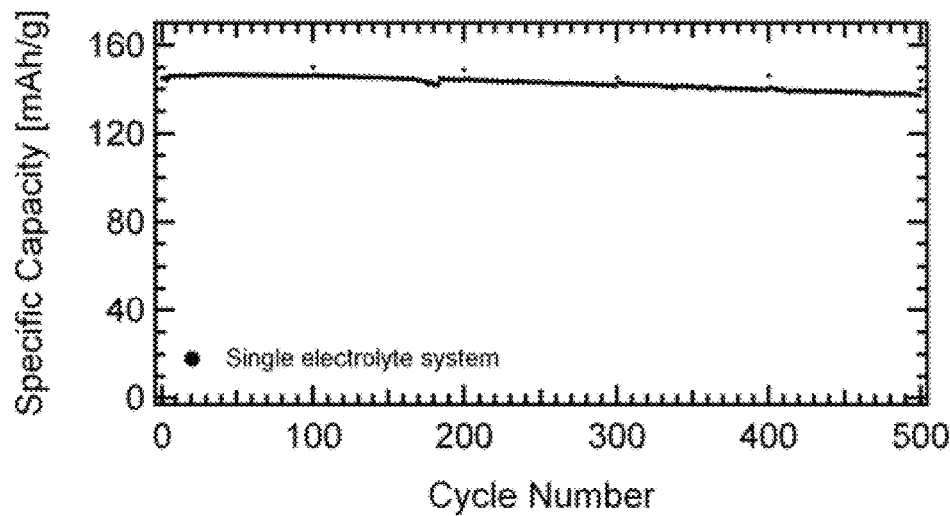
FIG. 12A shows specific capacity data over 500 cycles for a cell that contains one dry polymer electrolyte.

FIG. 12A shows specific capacity data over 500 cycles for a cell that contains one dry polymer electrolyte, a lithium metal anode and a lithium iron phosphate composite cathode. There is no measurable capacity fade over the first 100 cycles. After 500 cycles the capacity fade is estimated to be about 5%.

Figure 12B:
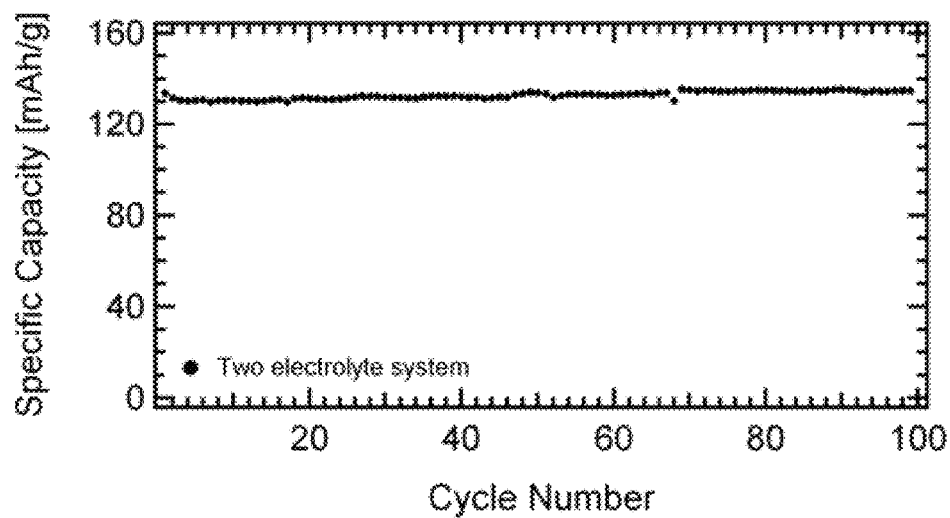
FIG. 12B shows specific capacity data over 100 cycles for a cell that contains two dry polymer electrolytes.

FIG. 12B shows specific capacity data over 100 cycles for a two-electrolyte cell. The cell contains both a first dry polymer electrolyte optimized for stability against the lithium metal anode film and a second dry polymer electrolyte optimized for conductivity in and over the composite cathode. Again, there is no measurable capacity fade over the first 100 cycles, indicating that there are no adverse effects from using the multi-layered electrolyte.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrochemical cell, comprising:
    a negative electrode configured to absorb and release alkali metal ions;
    an electrolyte layer in contact with the negative electrode, the electrolyte layer comprising a first block copolymer electrolyte and a first salt comprising the alkali metal; and
    a positive electrode comprising positive electrode active material, binder, a liquid electrolyte and optional electronically conducting carbon;
    wherein the liquid electrolyte comprises a fluorinated liquid and a second salt comprising the alkali metal, the liquid electrolyte immiscible with the first block copolymer electrolyte.

2. The electrochemical cell of claim 1 wherein the negative electrode is a metal foil comprising the alkali metal.

3. The electrochemical cell of claim 2 wherein the alkali metal comprises lithium.

4. The electrochemical cell of claim 1 wherein the negative electrode comprises negative electrode active material particles, a negative electrode electrolyte, and optional binder.

5. The electrochemical cell of claim 4 wherein the negative electrode electrolyte comprises a liquid electrolyte that is immiscible with the first block copolymer electrolyte.

6. The electrochemical cell of claim 5 wherein the liquid electrolyte is selected from the group consisting of ethers, alkyl carbonates, ionic liquids, and mixtures thereof.

7. The electrochemical cell of claim 4 wherein the negative electrode electrolyte comprises a second block copolymer electrolyte wherein the second block copolymer electrolyte is immiscible with the first block copolymer electrolyte.

8. The electrochemical cell of claim 1 wherein the positive electrode active material is selected from the group consisting of lithium metal oxides, lithium metal phosphates, elemental sulfur, sulfur composites with carbon, and sulfur composites with pyrolyzed polymer.

9. The electrochemical cell of claim 1 wherein a first block of the first block copolymer is ionically conductive and is selected from the group consisting of polyethers, polyamines, polyimides, polyamides, poly alkyl carbonates, polynitriles, polysiloxanes, polyphosphazines, polyolefins, polydienes, and combinations thereof.

10. The electrochemical cell of claim 1 wherein a first block of the first block copolymer comprises an ionically-conductive comb polymer, which comb polymer comprises a backbone and pendant groups.

11. The electrochemical cell of claim 10 wherein the backbone comprises one or more selected from the group consisting of polysiloxanes, polyphosphazines, polyethers, polydienes, polyolefins, polyacrylates, polymethacrylates, and combinations thereof.

12. The electrochemical cell of claim 10 wherein the pendants comprise one or more selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

13. The electrochemical cell of claim 1 wherein a second block of the first block copolymer is selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, polyfluorocarbons, polyvinylidene fluoride, and copolymers that contain styrene, methacrylate, and/or vinylpyridine.

14. The electrochemical cell of claim 1 wherein the fluorinated liquid comprises one or more selected from the group consisting of perfluoropolyethers, mono- or diol-terminated perfluoropolyethers, alkylcarbonate-terminated perfluoropolyethers, alkylcarbamate-terminated perfluoropolyethers, poly(perfluoropolyether)acrylates, poly(perfluoropolyether)methacrylates, polysiloxanes with pendant fluorinated groups, and poly(perfluoropolyether)glycidyl ethers.

15. The electrochemical cell of claim 1 wherein the fluorinated liquid comprises:
first polymers selected from the group consisting of polymerized versions of perfluoropolyether-acrylates, -methacrylates, and -glycidyl ethers; and
second polymers selected from the group consisting of polymerized versions of acrylates, methacrylates, or glycidyl ethers;
wherein the first polymers are copolymerized with the second polymers; and
wherein the second polymers comprise less than 10 wt % of the fluorinated liquid.

16. The electrochemical cell of claim 1 wherein the fluorinated liquid further comprises one or more additives selected from the group consisting of cyclic organic carbonates, cyclic acetals, organic phosphates, cyclic organic sulfates, and cyclic organic sulfonates.

17. The electrochemical cell of claim 1 wherein the positive electrode further comprises a polymer matrix into which the fluorinated liquid is absorbed to form a polymer gel electrolyte.

18. The electrochemical cell of claim 1, further comprising a separator electrolyte layer between the electrolyte layer and the positive electrode, the separator electrolyte layer comprising an electrolyte different the first block copolymer electrolyte.

19. The electrochemical cell of claim 18 wherein the separator electrolyte is selected from the group consisting of ceramic electrolytes, polymer electrolytes, and block copolymer electrolytes.

20. An electrochemical cell, comprising:
a negative electrode comprising an alkali metal film;
a separator layer in contact with the negative electrode, the separator layer comprising a block copolymer electrolyte and a first salt comprising the alkali metal; and
a positive electrode comprising positive electrode active material, binder and a liquid electrolyte comprising a fluorinated liquid and a second salt comprising the alkali metal;
wherein the liquid electrolyte immiscible with the block copolymer electrolyte.

21. An electrochemical cell, comprising:
a negative electrode comprising a film of lithium metal;
a separator layer in contact with the negative electrode, the separator layer comprising a block copolymer electrolyte and a first lithium salt; and
a positive electrode comprising nickel cobalt aluminum oxide particles, binder, a second lithium salt, and a liquid electrolyte comprising a fluorinated liquid;
wherein the liquid electrolyte is immiscible with the block copolymer electrolyte.

* * * * *